(12) United States Patent
Saito et al.

(10) Patent No.: US 9,581,094 B2
(45) Date of Patent: Feb. 28, 2017

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Yusuke Saito, Susono (JP); Satoru Tanaka, Odawara (JP); Satoshi Yoshizaki, Gotenba (JP); Ryutaro Moriguchi, Susono (JP); Yosuke Matsumoto, Susono (JP); Noriyasu Adachi, Numazu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/897,086

(22) PCT Filed: Jun. 11, 2013

(86) PCT No.: PCT/JP2013/066098
§ 371 (c)(1),
(2) Date: Dec. 9, 2015

(87) PCT Pub. No.: WO2014/199443
PCT Pub. Date: Dec. 18, 2014

(65) Prior Publication Data
US 2016/0123253 A1 May 5, 2016

(51) Int. Cl.
*F02P 5/00* (2006.01)
*F02D 37/02* (2006.01)
(Continued)

(52) U.S. Cl.
CPC ........... *F02D 37/02* (2013.01); *F01L 1/34* (2013.01); *F02D 41/0002* (2013.01);
(Continued)

(58) Field of Classification Search
CPC .... F02P 5/045; F02P 5/16; B60W 2710/0622; F02B 19/1085
(Continued)

(56) References Cited

U.S. PATENT DOCUMENTS 6,089,206 A 7/2000 Suzuki et al.
2002/0124831 A1 9/2002 Kondo
(Continued)

FOREIGN PATENT DOCUMENTS

| JP | H11-22609 A | 1/1999 |
| JP | 2002-339778 A | 11/2002 |
| JP | 2007-154847 A | 6/2007 |

*Primary Examiner* — John Kwon
(74) *Attorney, Agent, or Firm* — Andrews Kurth Kenyon LLP

(57) ABSTRACT

A target air amount for achieving a requested torque is calculated from the requested torque by using a virtual air-fuel ratio. The virtual air-fuel ratio is changed from a first air-fuel ratio to a second air-fuel ratio in response to a condition for switching an operation mode from an operation by the first air-fuel ratio to an operation by the second air-fuel ratio being satisfied. After the virtual air-fuel ratio is changed from the first air-fuel ratio to the second air-fuel ratio, a target air-fuel ratio is switched from the first air-fuel ratio to the second air-fuel ratio. After the virtual air-fuel ratio is changed from the first air-fuel ratio to the second air-fuel ratio, a target valve timing is switched from a first valve timing to a second valve timing.

7 Claims, 8 Drawing Sheets

(51) Int. Cl.
*F02D 41/14* (2006.01)
*F02D 41/30* (2006.01)
*F02D 41/00* (2006.01)
*F01L 1/34* (2006.01)
*F02D 41/04* (2006.01)
*F02P 9/00* (2006.01)

(52) U.S. Cl.
CPC ....... *F02D 41/0007* (2013.01); *F02D 41/045* (2013.01); *F02D 41/1456* (2013.01); *F02D 41/307* (2013.01); *F02D 41/3029* (2013.01); *F02D 41/3064* (2013.01); *F02P 9/002* (2013.01); *F02D 2041/001* (2013.01); *F02D 2041/1412* (2013.01); *Y02T 10/42* (2013.01)

(58) Field of Classification Search
USPC .............. 123/295, 305, 399, 406.11, 406.45, 123/406.47, 406.48, 480; 701/101, 701/103–105, 114, 115
See application file for complete search history.

(56) References Cited

U.S. PATENT DOCUMENTS

| | | | |
|---|---|---|---|
| 2016/0090935 A1* | 3/2016 | Tanaka | F02D 41/307 701/104 |
| 2016/0115892 A1* | 4/2016 | Tanaka | F02P 9/002 123/406.46 |
| 2016/0123246 A1* | 5/2016 | Saito | F02P 5/15 123/444 |
| 2016/0123250 A1* | 5/2016 | Matsumoto | F02D 41/3023 123/406.46 |
| 2016/0123252 A1* | 5/2016 | Yoshizaki | F02D 41/107 123/436 |

* cited by examiner

CONTROL DEVICE FOR INTERNAL COMBUSTION ENGINE

CROSS-REFERENCE TO RELATED APPLICATION

This is a national phase application based on the PCT International Patent Application No. PCT/JP2013/066098 filed Jun. 11, 2013, the entire contents of which are incorporated herein by reference.

TECHNICAL FIELD

The present invention relates to a control device that performs integrated control of an air amount, a fuel supply amount, and an ignition timing of an internal combustion engine that is configured to be capable of switching an air-fuel ratio that is used for operation between at least two air-fuel ratios.

BACKGROUND ART

Japanese Patent Laid-Open No. 11-22609 discloses technology (hereunder, referred to as "related art") relating to switch control of a combustion method in an internal combustion engine that can switch the combustion method of the internal combustion engine from stratified charge combustion to homogeneous combustion, or from homogeneous combustion to stratified charge combustion. Since the air-fuel ratio in stratified charge combustion is leaner than the air-fuel ratio in homogeneous combustion, switch of the combustion method is accompanied by switch of the air-fuel ratio. As the method for switching the air-fuel ratio, there is known a method that gradually changes the air-fuel ratio so that a torque level difference does not occur. However, with this known method, a desired torque cannot be obtained although the torque level difference is reduced, and there arises the problem of causing degradation of emission because the air-fuel ratio which is not originally intended is used. The above described related art is proposed as the solution to this problem.

According to the above described related art, at the time of switching from homogeneous combustion to stratified charge combustion, only a target air fuel ratio is switched in a step manner before a target equivalence ratio is switched in a step manner. In more detail, an air amount is increased in advance by increasing only the target air amount in a step manner, and the target equivalence ratio is decreased in a step manner at a timing at which the actual air amount reaches the target air amount. That is to say, in a period in which the air amount is increased later than the target air amount, the target equivalence ratio before switching of the combustion method is maintained. However, if a fuel amount is determined based on the target equivalence ratio before switching of the combustion method, the fuel amount becomes excessively larger than an amount that is necessary to keep a torque constant. Therefore, in the above described related art, the excessive amount of the fuel amount is corrected by retardation of an ignition timing, whereby avoidance of increase in the torque at a time before switching of the combustion method is performed.

Incidentally, when the air-fuel ratio is switched from a theoretical air-fuel ratio to a lean air-fuel ratio in an internal combustion engine equipped with a variable valve timing mechanism that changes a valve timing of an intake valve, switching of a target valve timing from a valve timing corresponding to the theoretical air-fuel ratio to a valve timing corresponding to the lean air-fuel ratio is performed. Thereby, the target valve timing is switched so that a valve overlap amount decreases, in response to switching of the air-fuel ratio from the theoretical air-fuel ratio to the lean air-fuel ratio.

Here, when the target valve timing is switched at a timing for switching the target air-fuel ratio, in a case of performing control of switching the target air amount prior to the target air-fuel ratio, as in the aforementioned related art, a lean air-fuel ratio is realized during a switching operation by the variable valve timing mechanism, and therefore, a possibility of a misfire due to worsening of combustion coincidentally arises. Therefore, the timing for switching the target valve timing can be also considered to be set at a time point of switching of the target air amount. However, if switching of the target valve timing is performed at the time point of the switching of the target air amount, the valve overlap amount is decreased prior to switching of the air-fuel ratio. In this case, a possibility coincidentally arises, that increase in the air amount becomes slow, and a transitional period until the actual air amount increases to the target air amount after switching of the target air amount is prolonged. Since in the transitional period, the actual torque becomes larger than a requested torque, the requested torque is realized by retardation control of an ignition timing and the torque level difference is eliminated. However, when the transitional period until the target air amount is realized is prolonged due to the influence of the decrease in the above described valve overlap amount, worsening of combustion and worsening of fuel efficiency are feared. Further, if the retardation control of the ignition timing lasts for a long time period due to prolongation of the transitional period, an increase in the temperature of the exhaust system components becomes a problem. The increase in the temperature of the exhaust system components can be prevented by providing a limitation onto the retardation time period of the ignition timing, but an increase in torque due to an excessive fuel amount cannot be avoided.

CITATION LIST

Patent Literature

Patent Literature 1: Japanese Patent Laid-Open No. 11-22609

SUMMARY OF INVENTION

The present invention is made in the light of the aforementioned problems, and has an object to switch an air-fuel ratio without causing a torque variation, in an internal combustion that is configured to be able to switch an air-fuel ratio for use in an operation between at least two air-fuel ratios.

The present invention can be applied to the configuration of a control device for an internal combustion engine. Hereunder, a general outline of a control device for an internal combustion engine according to the present invention will be described. However, as will be apparent from the contents of the present invention described below, the present invention can be applied to the procedures of a control method for an internal combustion engine and can also be applied to an algorithm of a program that is executed with a control device.

A control device according to the present invention adopts, as a control object, an internal combustion engine that has three kinds of actuators, and is configured to be capable of selecting an operation by a first air-fuel ratio and an operation by a second air-fuel ratio that is leaner than the first air-fuel ratio. The three kinds of actuators refer to a first actuator that changes an air amount, a second actuator that supplies fuel into a cylinder, and a third actuator that ignites a mixture gas in the cylinder. The first actuator includes a throttle, and a variable valve timing mechanism that changes a valve timing of an intake valve, and further, if the internal combustion engine is a turbocharging engine, the first actuator includes turbocharging property variable actuators that changes a turbocharging property of a turbocharger, more specifically, a variable nozzle and a wastegate valve. The second actuator is more specifically an injector that injects fuel, and includes a port injector that injects fuel into an intake port, and a cylinder injector that directly injects fuel into the cylinder. The third actuator is more specifically an ignition device. The control device according to the present invention performs integrated control of an air amount, a fuel supply amount and an ignition timing of the internal combustion engine by means of coordinated operations of these three kinds of actuators.

The control device according to the present invention can be embodied by a computer. More specifically, the control device according to the present invention can be constituted by a computer that is equipped with a memory in which a program that describes processing for realizing various functions is stored, and a processor that reads the program from the memory and executes the program. Functions that the control device according to the present invention is equipped with include, as functions for determining a target air amount and a target air-fuel ratio to be used in coordinated operations of the three kinds of actuators described above, a requested torque reception function, a target air-fuel ratio switching function, a target air amount calculation function, and a virtual air-fuel ratio changing function.

According to the requested torque reception function, a requested torque with respect to the internal combustion engine is received. The requested torque is calculated based on a signal that is responsive to the degree of opening of an accelerator pedal that is operated by the driver. In a case where the driver issues a deceleration request with respect to the internal combustion engine, a requested torque is obtained that decreases in accordance with the speed at which the driver releases the accelerator pedal. In a case where the driver issues an acceleration request with respect to the internal combustion engine, a requested torque is obtained that increases in accordance with the speed at which the driver depresses the accelerator pedal.

According to the target air amount calculation function, a target air amount for achieving the requested torque is calculated from the requested torque. In calculation of the target air amount, a parameter that provides a conversion efficiency of the air amount to torque is used. As the air-fuel ratio is leaner than the theoretical air-fuel ratio, the torque which is generated with the same air amount is reduced, and therefore, the parameter corresponding to the air-fuel ratio corresponds to the parameter that provides the conversion efficiency of the air amount to torque. The virtual air-fuel ratio is a parameter corresponding to the air-fuel ratio, and is one of the parameters that are used in calculation of the target air amount. A value of the virtual air-fuel ratio is variable, and is changed by the virtual air-fuel ratio changing function. According to the virtual air-fuel ratio changing function, the virtual air-fuel ratio is changed from the first air-fuel ratio to the second air-fuel ratio, in response to a condition for switching the operation mode from the operation by the first air-fuel ratio to the operation by the second air-fuel ratio. If the value of the requested torque is the same, the target air amount becomes smaller as the virtual air-fuel ratio is richer, and the target air amount becomes larger as the virtual air-fuel ratio is leaner.

According to the target air-fuel ratio switching function, the target air-fuel ratio is switched from the first air-fuel ratio to the second air-fuel ratio which is leaner than the first air-fuel ratio, after the virtual air-fuel ratio is changed from the first air-fuel ratio to the second air-fuel ratio. A specific timing for switching the target air-fuel ratio from the first air-fuel ratio to the second air-fuel ratio is preferably a time point at which a difference between the air amount (estimated air amount) that is estimated from the operation amount of the first actuator and the target air amount becomes equal to or smaller than a threshold value. Further, the target air-fuel ratio may be switched from the first air-fuel ratio to the second air-fuel ratio at a time point when a fixed time period elapses after a value of a parameter is changed.

The control device according to the present invention subjects the three kinds of actuator to coordinated operations based on the target air amount and the target air-fuel ratio determined by the above described processing. Functions that the control device of the present invention is equipped with include a first actuator control function, a second actuator control function and a third actuator control function as functions for performing coordinated operations based on the target air amount and the target air-fuel ratio.

According to the first actuator control function, an operation amount of the first actuator is determined based on the target air amount. Further, operation of the first actuator is performed in accordance with the determined operation amount. The actual air amount changes so as to track the target air amount according to the operation of the first actuator.

According to the second actuator control function, a fuel supply amount is determined based on the target air-fuel ratio. Operation of the second actuator is then performed in accordance with the fuel supply amount that is determined.

According to the third actuator control function, an ignition timing for achieving the requested torque is determined based on a torque that is estimated based on the operation amount of the first actuator and the target air-fuel ratio, and the requested torque. Operation of the third actuator is then performed in accordance with the determined ignition timing. The actual air amount can be estimated based on the operation amount of the first actuator, and the torque can be estimated based on the estimated air amount and the target air-fuel ratio. Operation of the third actuator is performed by correcting an excessive amount of the estimated torque with respect to the requested torque by means of the ignition timing.

Note that the first actuator control function includes a first valve timing calculation function, a second valve timing calculation function, and a target valve timing switching function, as the functions for determining the operation amount of the variable valve timing mechanism which is the first actuator.

According to the first valve timing calculation function, a first valve timing that is a target valve timing corresponding to the first air-fuel ratio is calculated based on the target air amount.

According to the second valve timing calculation function, a second valve timing that is a target valve timing corresponding to the second air-fuel ratio which is leaner than the first air-fuel ratio is calculated based on the target air amount.

According to the target valve timing switching function, after the virtual air-fuel ratio is changed from the first air-fuel ratio to the second air-fuel ratio, the target valve timing is switched from the first valve timing to the second valve timing.

A specific timing for switching the target valve timing from the first valve timing to the second valve timing is preferably a time point at which a first arrival prediction time period that is a prediction value of a time period until the air amount that is estimated from the operation amount of the first actuator arrives at the target air amount coincides with a second arrival prediction time period that is a prediction value of a time period that is necessary to operate a variable valve timing mechanism from a position of the first valve timing to a position of the second valve timing.

According to the control device according to the present invention, the functions which are described above are equipped, whereby the operation mode of the internal combustion engine can be switched from the operation by the first air-fuel ratio to the operation by the second air-fuel ratio which is leaner than the first air-fuel ratio without causing a torque variation.

DESCRIPTION OF EMBODIMENTS

[First Embodiment]

Hereunder, a first embodiment of the present invention is described with reference to the drawings.

An internal combustion engine (hereinafter, referred to as "engine") which is a control object in the present embodiment is a spark-ignition type, four-cycle reciprocating engine. Further, the engine is a so-called "lean-burn engine" that is constructed so as to be capable of selecting between a stoichiometric mode (first operation mode) that performs operation according to a theoretical air-fuel ratio and a lean mode (second operation mode) that performs operation according to an air-fuel ratio that is leaner than the theoretical air-fuel ratio as operation modes of the engine.

An ECU (Electrical Control Unit) mounted in the vehicle controls operations of the engine by actuating various kinds of actuators that are provided in the engine. The actuators actuated by the ECU include a throttle and variable valve timing mechanism (hereunder, referred to as "VVT") as a first actuator that changes an air amount, an injector as a second actuator that supplies fuel into a cylinder, and an ignition device as a third actuator that ignites an air-fuel mixture in a cylinder. The VVT is provided with respect to an intake valve. The injector is provided in an intake port. The ECU actuates these actuators to control operation of the engine. Control of the engine by the ECU includes switching of the operation mode from a stoichiometric mode to a lean mode, or from the lean mode to the stoichiometric mode.

Figure 1:
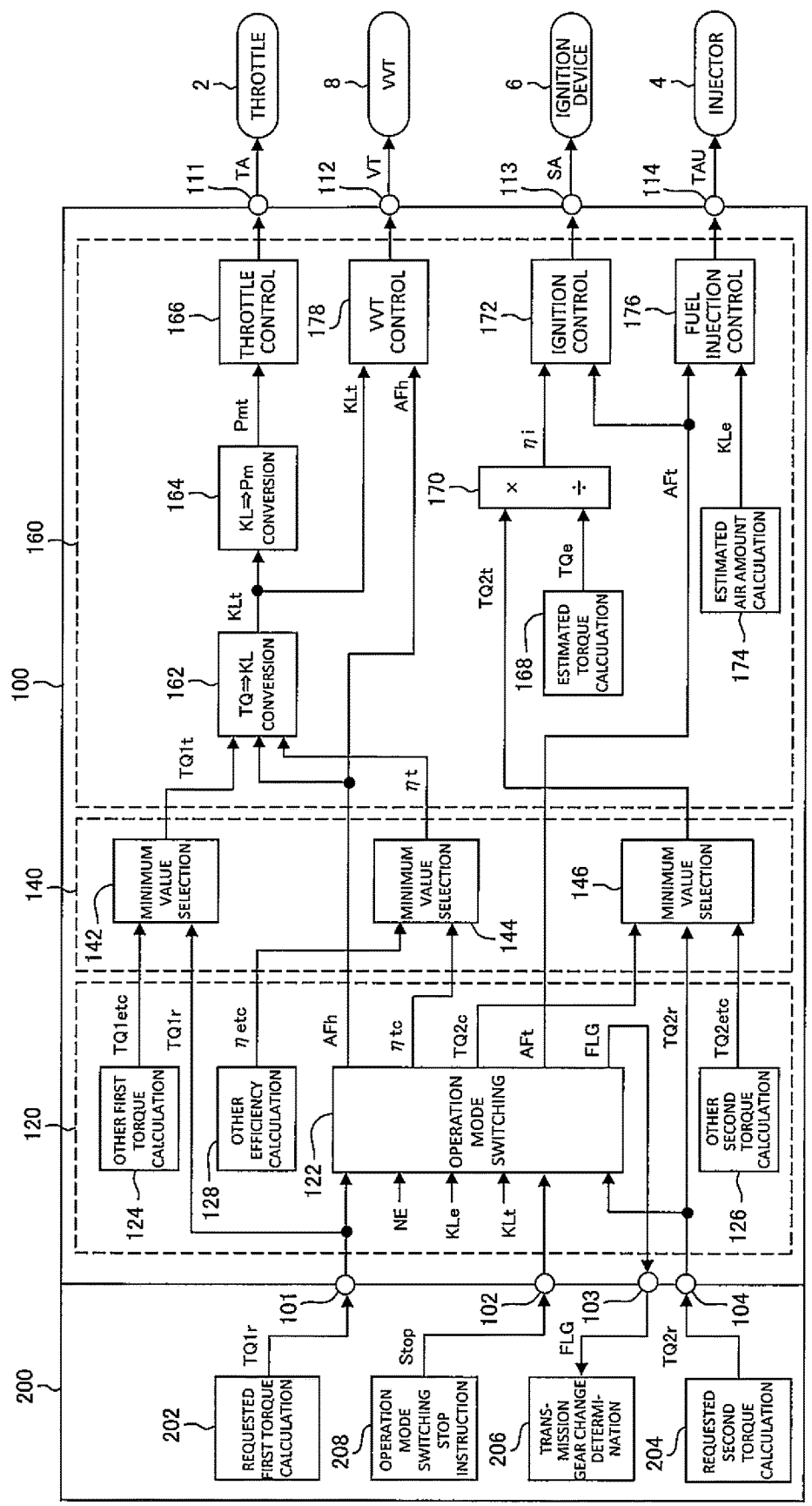
FIG. 1 is a block diagram illustrating a logic of a control device according to a first embodiment of the present invention.

In FIG. 1, the logic of the ECU according to the present embodiment is illustrated in a block diagram. The ECU includes an engine controller 100 and a powertrain manager 200. The engine controller 100 is a control device that directly controls the engine, and corresponds to the control device according to the present invention. The powertrain manager 200 is a control device that performs integrated control of the entire driving system that includes the engine, an electronically controlled automatic transmission, and also vehicle control devices such as a VSC and TRC. The engine controller 100 is configured to control operation of the engine based on signals received from the powertrain manager 200. The engine controller 100 and powertrain manager 200 are each realized by software. More specifically, the respective functions of the engine controller 100 and the powertrain manager 200 are realized in the ECU by reading programs stored in a memory and executing the programs using a processor. Note that in a case where the ECU is equipped with a multi-core processor, the engine controller 100 and the powertrain manager 200 can be respectively assigned to different cores or core groups.

In the block showing the powertrain manager 200 in FIG. 1, among various functions that the powertrain manager 200 is equipped with, some of the functions relating to control of the engine are represented by blocks. An arithmetic unit is allocated to each of these blocks. A program corresponding to each block is prepared in the ECU, and the functions of the respective arithmetic units are realized in the ECU by executing the programs using a processor. Note that in the case where the ECU is equipped with a multi-core processor, the arithmetic units configuring the powertrain manager 200 can be distributed and assigned to a plurality of cores.

An arithmetic unit 202 calculates a requested first torque and sends the calculated value to the engine controller 100. In the drawings, the requested first torque is described as "TQ1r". The first torque is a torque of a kind with respect to which the responsiveness required of the engine is not high and which it is sufficient to realize in the near future and need not be realized immediately. The requested first torque is a requested value of the first torque that the powertrain manager 200 requests with respect to the engine, and corresponds to the requested torque in the present invention. A signal that is output in response to the state of the degree of opening of the accelerator pedal from an unshown accelerator position sensor is input to the arithmetic unit 202. The requested first torque is calculated based on the aforementioned signal. Note that the requested first torque is a shaft torque.

An arithmetic unit 204 calculates a requested second torque and sends the calculated value to the engine controller 100. In the drawings, the requested second torque is described as "TQ2r". The second torque is a torque of a kind with respect to which the urgency or priority is higher than the first torque and for which a high responsiveness is required of the engine. That is, the second torque is of a kind which is required to be realized immediately. The term "responsiveness" used here refers to the responsiveness when the torque is temporarily decreased. The requested second torque is a requested value of the second torque that the powertrain manager 200 requests with respect to the engine. The requested second torque that is calculated by the arithmetic unit 204 includes various kinds of torques requested from the vehicle control system, such as a torque requested for transmission control of the electronically controlled automatic transmission, a torque requested for traction control, and a torque requested for sideslip prevention control. While the first torque is a torque that the engine is required to generate stably or over an extended period, the second torque is a torque that the engine is required to generate suddenly or during a short period. Therefore, the arithmetic unit 204 outputs a valid value that is in accordance with the size of the torque that it is desired to realize only in a case where an event has actually arisen in which such a torque is required, and outputs an invalid value during a period in which such an event does not arise. The invalid value is set to a value that is larger than the maximum shaft torque that the engine can output.

An arithmetic unit 206 calculates a transmission gear ratio of the automatic transmission, and sends a signal indicating the transmission gear ratio to an unshown transmission controller. The transmission controller is realized as one function of the ECU, similarly to the powertrain manager 200 and the engine controller 100. A flag signal from the engine controller 100 is input to the arithmetic unit 206. In the drawings, the flag signal is described as "FLG". The flag signal is a signal that indicates that the state is one in which switching of the operation mode is being performed. During a period in which the flag signal is "on", the arithmetic unit 206 fixes the transmission gear ratio of the automatic transmission. That is to say, while switching of the operation mode is being performed, change of the transmission gear ratio by the automatic transmission is prohibited so that the operating state of the engine does not change to a large degree.

In response to a predetermined condition being satisfied, an arithmetic unit 208 sends a stop signal to the engine controller 100 that instructs the engine controller 100 to stop switching of the operation mode. In the drawings, the stop signal is described as "Stop". The predetermined condition is that a request to change the operating state of the engine to a large degree is output from the powertrain manager 200. For example, in a case where the transmission gear ratio of the automatic transmission is changed, and in a case where special requests regarding the ignition timing and the fuel injection amount are issued to the engine to warm up the catalyst, the stop signal is outputted from the arithmetic unit 208.

Next, the configuration of the engine controller 100 will be described. Interfaces 101, 102, 103 and 104 are arranged between the engine controller 100 and the powertrain manager 200. The interface 101 corresponds to requested torque reception means in the present invention. The requested first torque is passed to the engine controller 100 at the interface 101. The stop signal is passed to the engine controller 100 at the interface 102. The flag signal is passed to the engine controller 100 at the interface 103. The requested second torque is passed to the engine controller 100 at the interface 104.

In the block illustrating the engine controller 100 in FIG. 1, among the various functions with which the engine controller 100 is equipped, functions relating to coordinated operations of the three kinds of actuators, that is, a throttle 2 and a VVT 8 as a first actuator, an injector 4 as a second actuator, and an ignition device 6 as a third actuator are represented with blocks. An arithmetic unit is allocated to each of these blocks. A program corresponding to each block is prepared in the ECU, and the functions of the respective arithmetic units are realized in the ECU by executing the programs using a processor. Note that in the case where the ECU is equipped with a multi-core processor, the arithmetic units configuring the engine controller 100 can be distributed and assigned to a plurality of cores.

The configuration of the engine controller 100 is broadly divided into three large arithmetic units 120, 140 and 160. The large arithmetic unit 120 calculates values of various control parameters with respect to the engine. Target values of various control amounts with respect to the engine are included in the control parameters. In addition, a value calculated based on a requested value that is sent from the powertrain manager 200, and a value that is calculated within the large arithmetic unit 120 based on information relating to the operating state of the engine are included in the target values. Note that, while a requested value is a value of a control amount that is unilaterally requested from the powertrain manager 200 without taking the state of the engine into consideration, a target value is a value of a control amount that is set based on a realizable range that is decided depending on the state of the engine. The large arithmetic unit 120 is, more specifically, constituted by four arithmetic units 122, 124, 126, and 128.

The arithmetic unit 122 calculates, as control parameters for the engine, a target air-fuel ratio, a virtual air-fuel ratio, a target efficiency for switching, and a target second torque for switching. In the drawings, the target air-fuel ratio is described as "AFt", the virtual air-fuel ratio is described as "AFh", the target efficiency for switching is described as "ηtc", and the target second torque for switching is described as "TQ2c". The target air-fuel ratio is a target value of the air-fuel ratio to be realized by the engine, and is used for calculating a fuel injection amount. On the other hand, the virtual air-fuel ratio is a parameter that provides a conversion efficiency of the air amount to torque, and is used for calculating a target air amount. The target efficiency for switching is a target value of the ignition timing efficiency for switching of the operation mode, and is used for calculating the target air amount. The term "ignition timing efficiency" refers to the proportion of torque that is actually output with respect to the torque that can be output when the ignition timing is the optimal ignition timing. When the ignition timing is the optimal ignition timing, the ignition timing efficiency is 1 that is the maximum value thereof. Note that the term "optimal ignition timing" fundamentally refers to the MBT (minimum advance for best torque), and when a trace knock ignition timing is set, the term "optimal ignition timing" refers to the ignition timing that is located further on the retardation side among the MBT and the trace knock ignition timing. The target second torque for switching is a target value of the second torque for switching of the operation mode, and is used to switch the calculation of the ignition timing efficiency when switching the operation mode. Switching of the operation mode is executed by combining the values of these control parameters that are calculated with the arithmetic unit 122. The relation between the contents of the processing performed by the arithmetic unit 122 and switching of the operation mode will be described in detail later.

In addition to the requested first torque, the requested second torque, and the stop signal that are received from the powertrain manager 200, various kinds of information relating to the operating state of the engine such as the engine speed is also input to the arithmetic unit 122. Among these, information for determining the timing for switching the operation mode is the requested first torque. The requested second torque and the stop signal are used as information for determining whether switching of the operation mode is permitted or prohibited. When the stop signal is inputted, and when the requested second torque of a valid value is inputted, the arithmetic unit 122 does not execute processing relating to switching the operation mode. Further, during switching of the operation mode, that is, while executing calculation processing for switching the operation mode, the arithmetic unit 122 sends the aforementioned flag signal to the powertrain manager 200.

The arithmetic unit 124 calculates, as a control parameter for the engine, a torque that is classified as a first torque among torques that are necessary for maintaining the current operating state of the engine or for realizing a scheduled predetermined operating state. In this case, the torque that is calculated by the arithmetic unit 124 is referred to as "other first torque". In the drawings, the other first torque is described as "TQ1etc". The other first torque includes torque within a range of variation that can be achieved by only control of the air amount, out of torques necessary for keeping a predetermined idling speed in a case where the engine is in an idling state. The arithmetic unit 124 outputs a valid value only in a case where such a torque is actually required, and calculates an invalid value during a period in which such a torque is not required. The invalid value is set to a value that is larger than the maximum shaft torque that the engine can output.

The arithmetic unit 126 calculates, as a control parameter for the engine, a torque that is classified as a second torque among torques that are necessary for maintaining the current operating state of the engine or for realizing a scheduled predetermined operating state. In this case, the torque that is calculated by the arithmetic unit 126 is referred to as "other second torque". In the drawings, the other second torque is described as "TQ2etc". The other second torque includes torque requiring control of an ignition timing for achievement of the torque, out of torques that are required to keep a predetermined idling speed, in the case where the engine is an idling state. The arithmetic unit 126 outputs a valid value only in a case where such a torque is actually required, and calculates an invalid value during a period in which such a torque is not required. The invalid value is set to a value that is larger than the maximum shaft torque that the engine can output.

The arithmetic unit 128 calculates, as a control parameter for the engine, an ignition timing efficiency that is necessary for maintaining the current operating state of the engine or for realizing a scheduled predetermined operating state. In this case, the ignition timing efficiency that is calculated by the arithmetic unit 128 is referred to as "other efficiency". In the drawings, the other efficiency is described as "ηetc". An ignition timing efficiency that is necessary for warming up an exhaust purification catalyst when starting the engine is included in the other efficiency. The more the ignition timing efficiency is lowered, the less the amount of energy that is converted to torque will be among the energy generated by the combustion of fuel, and thus an amount of energy that is increased by an amount corresponding to the decrease in the energy converted to torque will be discharged to the exhaust passage together with the exhaust gas and used to warm up the exhaust purification catalyst. Note that, during a period in which it is not necessary to realize such efficiency, the efficiency value outputted from the arithmetic unit 128 is held at a value of 1 that is the maximum value.

The requested first torque, the other first torque, the target air-fuel ratio, the virtual air-fuel ratio, the target efficiency for switching, the other efficiency, the requested second torque, the target second torque for switching, and the other second torque are outputted from the large arithmetic unit 120 configured as described above. These control parameters are input to the large arithmetic unit 140. Note that, although the requested first torque and the requested second torque that are received from the powertrain manager 200 are shaft torques, correction of these torques into indicated torques is performed at the large arithmetic unit 120. Correction of the requested torque to the indicated torque is performed by adding or subtracting a friction torque, an auxiliary driving torque and a pump loss to or from the requested torque. Note that, torques such as the target second torque for switching that are calculated within the large arithmetic unit 120 are each calculated as an indicated torque.

Next, the large arithmetic unit 140 will be described. As described above, various engine control parameters are sent to the large arithmetic unit 140 from the large arithmetic unit 120. Among these, the requested first torque and the other first torque are requests with respect to control amounts that belong to the same category, and these cannot be realized simultaneously. Likewise, the requested second torque, the other second torque and the target second torque for switching are requests with respect to control amounts that belong to the same category, and these cannot be realized simultaneously. Likewise, the target efficiency for switching and the other efficiency are requests with respect to control amounts that belong to the same category, and these cannot be realized simultaneously. Consequently, processing is necessary that performs a mediation process for each control amount category. As used herein, the term "mediation" refers to a computation process for obtaining a single numerical value from a plurality of numerical values, such as, for example, selecting a maximum value, selecting a minimum value, averaging, or superimposing, and a configuration can also be adopted in which the mediation process appropriately combines a plurality of kinds of computation processes. To execute such kind of mediation for each control amount category, the large arithmetic unit 140 includes three arithmetic units 142, 144, and 146.

The arithmetic unit 142 is configured to perform a mediation process with respect to the first torque. The requested first torque and the other first torque are inputted to the arithmetic unit 142. The arithmetic unit 142 performs a mediation process on these values, and outputs a torque that is obtained as the mediation result as a target first torque that is finally determined. In the drawings, the finally determined target first torque is described as "TQ1t". Minimum value selection is used as the mediation method in the arithmetic unit 142. Accordingly, in a case where a valid value is not output from the arithmetic unit 124, the requested first torque that is provided from the powertrain manager 200 is calculated as the target first torque.

The arithmetic unit 144 is configured to perform a mediation process with respect to the ignition timing efficiency. The target efficiency for switching and the other efficiency are inputted to the arithmetic unit 144. The arithmetic unit 144 performs a mediation process on these values, and outputs an efficiency that is obtained as the mediation result as a target efficiency that is finally determined. In the drawings, the finally determined target efficiency is described as "ηt". Minimum value selection is used as the mediation method in the arithmetic unit 144. From the viewpoint of fuel consumption performance, it is preferable that the ignition timing efficiency is 1 which is the maximum value thereof. Therefore, as long as no special event occurs, the target efficiency for switching that is calculated by the arithmetic unit 122 and the other efficiency that is calculated by the arithmetic unit 128 are each maintained at a value of 1 that is the maximum value. Accordingly, the value of the target efficiency that is output from the arithmetic unit 144 is fundamentally 1, and a value that is less than 1 is only selected in a case where an event of some kind has occurred.

The arithmetic unit 146 is configured to perform a mediation process with respect to the second torque. The requested second torque, the other second torque, and the target second torque for switching are inputted to the arithmetic unit 146. The arithmetic unit 146 performs a mediation process on these values, and outputs a torque that is obtained as the mediation result as a target second torque that is finally determined. In the drawings, the finally determined target second torque is described as "TQ2t". Minimum value selection is used as the mediation method in the arithmetic unit 146. The second torque, including the target second torque for switching, is fundamentally an invalid value, and is switched to a valid value showing the size of the torque it is desired to realize only in a case where a specific event has occurred. Accordingly, the target second torque that is output from the arithmetic unit 146 is also fundamentally an invalid value, and a valid value is selected in only a case where an event of some kind has occurred.

The target first torque, the target efficiency, the virtual air-fuel ratio, the target air-fuel ratio, and the target second torque are output from the large arithmetic unit 140 that is configured as described above. These control parameters are input to the large arithmetic unit 160.

The large arithmetic unit 160 corresponds to an inverse model of the engine, and is constituted by a plurality of models that are represented by a map or a function. Operation amounts of the respective actuators 2, 4, 6, and 8 for coordinated operations are calculated by the large arithmetic unit 160. Among the control parameters that are inputted from the large arithmetic unit 140, the target first torque and the target second torque are each handled as target values of the torque with respect to the engine. However, the target second torque takes priority over the target first torque. In the large arithmetic unit 160, calculation of operation amounts of the respective actuators 2, 4, 6, and 8 is performed so as to achieve the target second torque in a case where the target second torque is a valid value, or so as to achieve the target first torque in a case where the target second torque is an invalid value. Calculation of the operation amounts is performed so as to also achieve the target air-fuel ratio and the target efficiency simultaneously with the target torque. That is, according to the control device of the present embodiment, the torque, the efficiency, and the air-fuel ratio are used as control amounts of the engine, and air amount control, ignition timing control, and fuel injection amount control are conducted based on the target values of these three kinds of control amounts.

The large arithmetic unit 160 includes a plurality of arithmetic units 162, 164, 166, 168, 170, 172, 174, 176, and 178. Among these arithmetic units, the arithmetic units 162, 164, 166, and 178 relate to air amount control, the arithmetic units 168, 170, and 172 relate to ignition timing control, and the arithmetic units 174 and 176 relate to fuel injection amount control. Hereunder, the functions of the respective arithmetic units are described in detail in order, starting from the arithmetic units relating to air amount control.

The target first torque, the target efficiency and the virtual air-fuel ratio are inputted to the arithmetic unit 162. The arithmetic unit 162 corresponds to target air amount calculation means of the present invention, and uses the target efficiency and the virtual air-fuel ratio to back-calculate a target air amount for achieving the target first torque from the target first torque. In this calculation, the target efficiency and the virtual air-fuel ratio are used as parameters that provide a conversion efficiency of the air amount to torque. Note that, in the present invention, the term "air amount" refers to the amount of air that is drawn into the cylinders, and a charging efficiency or a load factor, which are non-dimensional equivalents of the air amount, are within an equal range to the air amount in the present invention.

The arithmetic unit 162 first calculates a target torque for air amount control by dividing the target first torque by the target efficiency. If the target efficiency is less than 1, the target torque for air amount control becomes larger than the target first torque. This means that a requirement with respect to the air amount control by the actuators 2 and 8 is to enable the potential output of torque that is greater than the target first torque. On the other hand, if the target efficiency is 1, the target first torque is calculated as it is as the target torque for air amount control.

Next, the arithmetic unit 162 converts the target torque for air amount control to a target air amount using a torque-air amount conversion map. The torque-air amount conversion map is prepared on the premise that the ignition timing is the optimal ignition timing, and is a map in which the torque and the air amount are associated using various engine status amounts, such as the engine speed and the air-fuel ratio as keys. This map is created based on data obtained by testing the engine. Actual values or target values of the engine status amounts are used to search the torque-air amount conversion map. With regard to the air-fuel ratio, the virtual air-fuel ratio is used to search the map. Accordingly, at the arithmetic unit 162, the air amount that is required to realize the target torque for air amount control under the virtual air-fuel ratio is calculated as the target air amount. In the drawings, the target air amount is described as "KLt".

The arithmetic unit 164 back-calculates a target intake pipe pressure that is a target value of the intake pipe pressure from the target air amount. A map that describes the relation between an air amount that is drawn into the cylinders through the intake valve and the intake pipe pressure is used to calculate the target intake pipe pressure. The relation between the air amount and the intake pipe pressure changes depending on the valve timing. Therefore, when calculating the target intake pipe pressure, a parameter value of the aforementioned map is determined based on the current valve timing. The target intake pipe pressure is described as "Pmt" in the drawings.

The arithmetic unit 166 calculates a target degree of throttle opening that is a target value of the degree of throttle opening based on the target intake pipe pressure. An inverse model of the air model is used to calculate the target degree of throttle opening. The air model is a physical model which is obtained as the result of modeling the response characteristic of the intake pipe pressure with respect to operation of the throttle 2. Therefore, the target degree of throttle opening that is required to achieve the target intake pipe pressure can be back-calculated from the target intake pipe pressure using the inverse model thereof. The target degree of throttle opening is described as "TA" in the drawings. The target degree of throttle opening calculated by the arithmetic unit 166 is converted to a signal for driving the throttle 2, and is sent to the throttle 2 through an interface 111 of the ECU. The arithmetic units 164 and 166 correspond to first actuator control means according to the present invention.

The arithmetic unit 178 calculates a target valve timing that is a target value of the valve timing based on the target air amount. A map in which the air amount and the valve timing are associated using the engine speed as an argument is utilized to calculate the target valve timing. The target valve timing is the optimal displacement angle of the VVT 8 for achieving the target air amount based on the current engine speed, and the specific value thereof is determined by adaptation for each air amount and each engine speed. However, an optimal valve timing for achieving the target air amount becomes a value that differs depending on the air-fuel ratio, and therefore, specified maps corresponding to various air-fuel ratios are set in the arithmetic unit 178 in advance. In the arithmetic unit 178, switching of the map for use in calculation of the target valve timing based on the virtual air-fuel ratio is performed. The target valve timing is described as "VT" in the drawings. The target valve timing calculated by the arithmetic unit 178 is converted to a signal for driving the VVT 8, and is sent to the VVT 8 through an interface 112 of the ECU. The arithmetic unit 178 also corresponds to first actuator control means in the present invention. A content of a processing that is performed in the arithmetic unit 178 will be described in detail later.

Next, the functions of the arithmetic units relating to ignition timing control will be described. The arithmetic unit 168 calculates an estimated torque based on the actual degree of throttle opening and the valve timing realized by the above described air amount control. The term "estimated torque" as used in the present description refers to torque that can be output in a case where the ignition timing is set to the optimal ignition timing based on the current degree of throttle opening and valve timing and the target air-fuel ratio. The arithmetic unit 168 first calculates an estimated air amount based on a measured value of the degree of throttle opening and a measured value of the valve timing using a forward model of the aforementioned air model. The estimated air amount is an estimated value of an air amount that is actually realized by the current degree of throttle opening and valve timing. Next, the arithmetic unit 168 converts the estimated air amount to an estimated torque using the torque-air amount conversion map. The target air-fuel ratio is used as a search key when searching the torque-air amount conversion map. The estimated torque is described as "TQe" in the drawings.

The target second torque and the estimated torque are inputted to the arithmetic unit 170. The arithmetic unit 170 calculates an indicated ignition timing efficiency that is an indicated value of the ignition timing efficiency based on the target second torque and the estimated torque. The indicated ignition timing efficiency is expressed as a proportion of the target second torque to the estimated torque. However, an upper limit is defined for the indicated ignition timing efficiency, and the value of the indicated ignition timing efficiency is set as 1 in a case where the proportion of the target second torque with respect to the estimated torque exceeds 1. The indicated ignition timing efficiency is described as "ηi" in the drawings.

The arithmetic unit 172 calculates the ignition timing based on the indicated ignition timing efficiency. More specifically, the arithmetic unit 172 calculates the optimal ignition timing based on engine status amounts such as the engine speed, the requested torque and the air-fuel ratio, and calculates a retardation amount with respect to the optimal ignition timing based on the indicated ignition timing efficiency. When the indicated ignition timing efficiency is 1, the retardation amount is set as zero, and the retardation amount is progressively increased as the indicated ignition timing efficiency decreases from 1. The arithmetic unit 172 then calculates the result of addition of the retardation amount to the optimal ignition timing as a final ignition timing. However, the final ignition timing is restricted by a retardation limit guard. A retardation limit refers to the most retarded ignition timing at which no occurrence of misfire is ensured, and the retardation limit guard guards the final ignition timing so that the ignition timing is not retarded beyond the retardation limit. A map in which the optimal ignition timing and various engine status amounts are associated can be used to calculate the optimal ignition timing. A map in which the retardation amount, the ignition timing efficiency and various engine status amounts are associated can be used to calculate the retardation amount. The target air-fuel ratio is used as a search key to search these maps. The ignition timing is described as "SA" in the drawings. The ignition timing calculated by the arithmetic unit 172 is converted to a signal for driving the ignition device 6, and is sent to the ignition device 6 through an interface 113 of the ECU. The arithmetic units 168, 170 and 172 correspond to third actuator control means in the present invention.

Next, functions of the arithmetic units relating to fuel injection amount control will be described. The arithmetic unit 174 calculates an estimated air amount based on a measured value of the degree of throttle opening and a measured value of the valve timing using the forward model of the air model described above. The estimated air amount calculated by the arithmetic unit 174 is preferably an air amount that is predicted to arise at a timing at which the intake valve closes. An air amount that will arise in the future can be predicted, for example, based on the target degree of throttle opening by setting a delay time period from calculation of the target degree of throttle opening until the output thereof. The estimated air amount is described as "KLe" in the drawings.

The arithmetic unit 176 calculates a fuel injection amount, that is, a fuel supply amount, that is required to achieve the target air-fuel ratio based on the target air-fuel ratio and the estimated air amount. Calculation of the fuel injection amount is executed when the timing for calculating a fuel injection amount arrives with respect to each cylinder. The fuel injection amount is described as "TAU" in the drawings. The fuel injection amount calculated by the arithmetic unit 176 is converted to a signal for driving the injector 4, and is sent to the injector 4 through an interface 114 of the ECU. The arithmetic units 174 and 176 correspond to second actuator control means in the present invention.

The foregoing is an overview of the logic of the ECU according to the present embodiment. Next, the arithmetic unit 122 that is a main portion of the ECU according to the present embodiment will be described in detail.

Figure 2:
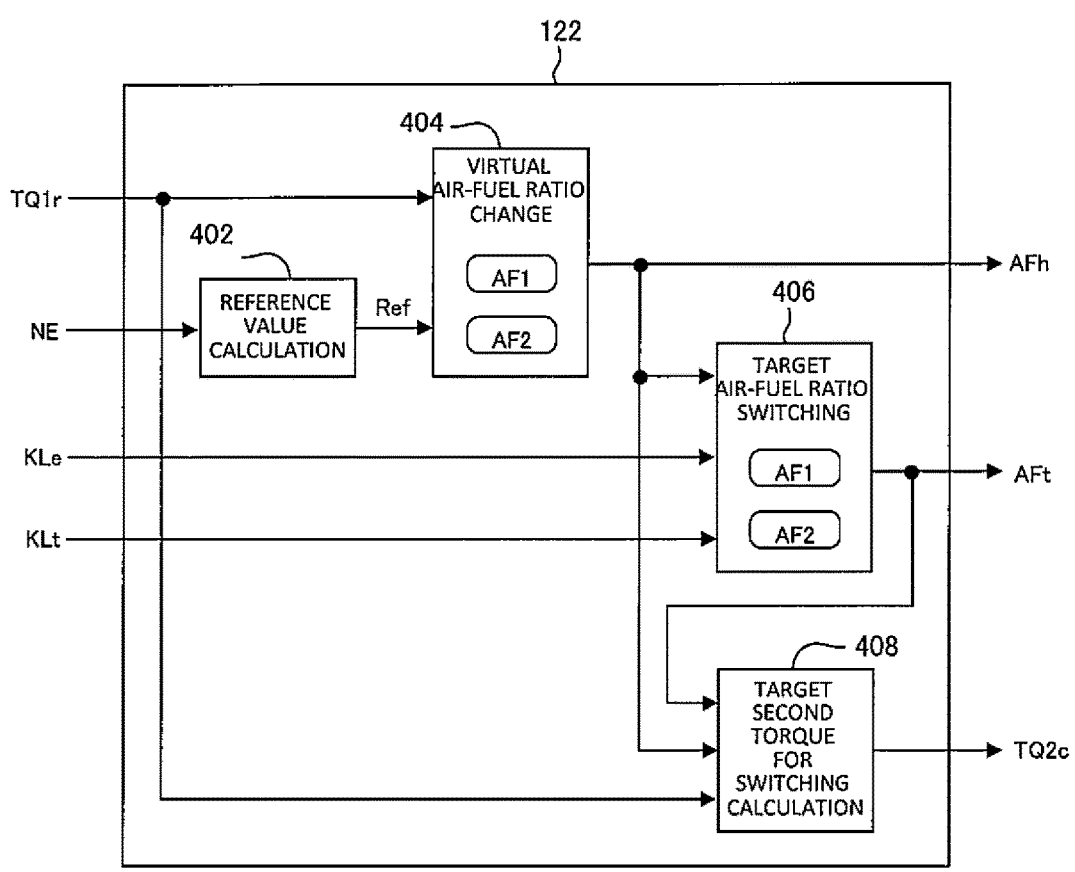
FIG. 2 is a block diagram illustrating a logic of switching of an operation mode of the control device according to the first embodiment of the present invention.

The logic of the arithmetic unit 122 is illustrated by means of a block diagram in FIG. 2. Inside the block illustrating the arithmetic unit 122 in FIG. 2, among the various functions that the arithmetic unit 122 is equipped with, functions relating to switching of the operation mode are represented by blocks. An arithmetic unit is allocated to each of these blocks. A program corresponding to each block is prepared in the ECU, and the functions of the respective arithmetic units are realized in the ECU by executing the programs using a processor. Note that in the case where the ECU includes a multi-core processor, arithmetic units 402, 404, 406 and 408 that configure the arithmetic unit 122 can be distributed and assigned to a plurality of cores.

First, an arithmetic unit 402 will be described. The arithmetic unit 402 calculates a reference value for the torque. The reference value is a torque that serves as a boundary between a lean mode and a stoichiometric mode, and the optimal value is adapted for each engine speed from the viewpoint of fuel consumption performance, exhaust gas performance and drivability. The arithmetic unit 402 refers to a previously prepared map to calculate a reference value that is suitable for the engine speed. The reference value is described as "Ref" in the drawings.

Next, the arithmetic unit 404 will be described. The requested first torque is inputted to the arithmetic unit 404. In addition, the reference value calculated by the arithmetic unit 402 is set with respect to the arithmetic unit 404. The arithmetic unit 404 changes a value of the virtual air-fuel ratio that is used to calculate the target air amount, based on the relation between the requested first torque and the reference value that are inputted. More specifically, the arithmetic unit 404 switches the virtual air-fuel ratio from a first air-fuel ratio to a second air-fuel ratio or from the second air-fuel ratio to the first air-fuel ratio. The first air-fuel ratio is the theoretical air-fuel ratio (for example, 14.5). The first air-fuel ratio is described as "AF1" in the drawings. The second air-fuel ratio is a leaner air-fuel ratio than the first air-fuel ratio, and is set to a certain fixed value (for example, 22.0). The second air-fuel ratio is described as "AF2" in the drawings. The arithmetic unit 404 corresponds to virtual air-fuel ratio changing means in the present invention.

During a period in which the requested first torque is greater than the reference value, the arithmetic unit 404 sets the virtual air-fuel ratio to the first air-fuel ratio in response to the requested first torque being greater than the reference value. If the requested first torque decreases in accordance with a deceleration request of the driver and in due course becomes less than the reference value, the arithmetic unit 404 switches the virtual air-fuel ratio from the first air-fuel ratio to the second air-fuel ratio in response to the requested first torque decreasing to a value that is less than or equal to the reference value.

Next, the arithmetic unit 406 will be described. The arithmetic unit 406 corresponds to target air-fuel ratio switching means of the present invention. The first air-fuel ratio that is used in the stoichiometric mode and the second air-fuel ratio that is used in the lean mode are previously set as default values of the target air-fuel ratio in the arithmetic unit 406. The virtual air-fuel ratio determined by the arithmetic unit 404, a value of the target air amount calculated in a previous step by the arithmetic unit 162, and a value of the estimated air amount calculated in a previous step by the arithmetic unit 174 are inputted to the arithmetic unit 406.

Upon detecting that the virtual air-fuel ratio that is inputted from the arithmetic unit 404 is switched from the first air-fuel ratio to the second air-fuel ratio, the arithmetic unit 406 calculates a difference between the target air amount and the estimated air amount. Subsequently, when the estimated air amount sufficiently approaches the estimated air amount, more specifically, when the difference between the target air amount and the estimated air amount becomes equal to or smaller than a predetermined threshold value, the arithmetic unit 406 switches the target air-fuel ratio from the first air-fuel ratio to the second air-fuel ratio. That is to say, at the time of deceleration when the requested first torque decreases, switching of the target air-fuel ratio from the first air-fuel ratio to the second air-fuel ratio is performed, after switching of the virtual air-fuel ratio from the first air-fuel ratio to the second air-fuel ratio. By switching of the target air-fuel ratio, the operation mode is switched from the stoichiometric mode to the lean mode.

Finally the arithmetic unit 408 will be described. The arithmetic unit 408 calculates the target second torque for switching. As described above, the target second torque for switching is inputted to the arithmetic unit 146 together with the requested second torque and the other second torque, and the smallest value among those values is selected by the arithmetic unit 146. The requested second torque and the other second torque are normally invalid values, and are switched to valid values only in a case where a special event has occurred. The same applies to the target second torque for switching also, and the arithmetic unit 430 normally sets the output value of the target second torque for switching to an invalid value.

The requested first torque, the target air-fuel ratio, and the virtual air-fuel ratio are inputted to the arithmetic unit 408. According to the logic of the arithmetic units 404 and 408, the target air-fuel ratio and the virtual air-fuel ratio match before switching the operation mode, and also match after the switching processing is completed. However, during the processing to switch the operation mode, a gap arises between the target air-fuel ratio and the virtual air-fuel ratio. The arithmetic unit 408 calculates the target second torque for switching that has a valid value, only during a period in which a gap arises between the target air-fuel ratio and the virtual air-fuel ratio. In this case, the requested first torque is used as the valid value of the target second torque for switching. That is, during a period in which a gap arises between the target air-fuel ratio and the virtual air-fuel ratio, the requested first torque is output from the arithmetic unit 410 as the target second torque for switching.

Figure 3:
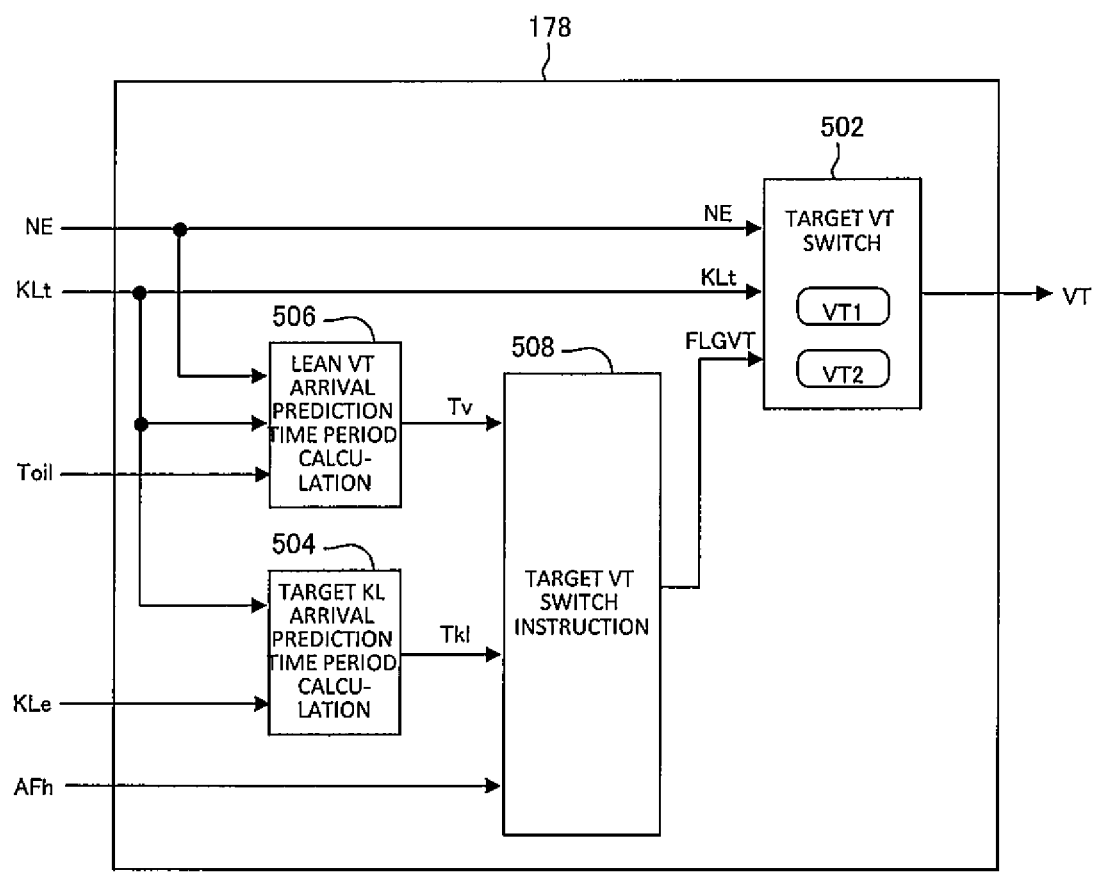
FIG. 3 is a block diagram illustrating a logic of switching of a target valve timing of the control device according to the first embodiment of the present invention.

The foregoing is a detailed description of the logic of the arithmetic unit 122, that is, the logic for switching the operation mode that is adopted in the present embodiment. Next, the arithmetic unit 178 which is a main part of the ECU according to the present embodiment will be described in detail. FIG. 3 illustrates a logic of the arithmetic unit 178 in a block diagram. In a block illustrating the arithmetic unit 178 in FIG. 3, functions relating to switching of the target valve timing are expressed in blocks, out of various functions that are included by the arithmetic unit 178. Arithmetic units are assigned to the respective blocks. In the ECU, programs that correspond to the respective blocks are prepared, and these programs are executed by the processor, whereby the functions of the respective arithmetic units are realized in the ECU. In a case where the ECU is equipped with a multi-core processor, arithmetic units 502, 504, 506 and 508 that configure the arithmetic unit 178 can be dispersedly allocated to a plurality of cores.

First, the arithmetic unit 502 will be described. The arithmetic unit 502 calculates the target valve timing based on the target air amount. In calculation of the target valve timing, a map is used, in which the air amount and the valve timing are related to each other with the engine speed as an argument. In the arithmetic unit 502, a stoichiometric VT map in which the target valve timing is optimized under the theoretical air-fuel ratio which is a value of the first air-fuel ratio, and a lean VT map in which the target valve timing is optimized under the lean air-fuel ratio which is a value of the second air-fuel ratio are set in advance. In the following explanation, the target valve timing which is calculated by using the stoichiometric VT map will be described as "a first valve timing", and the target valve timing which is calculated by using the lean VT map will be described as "a second valve timing". In the drawings, the first valve timing is described as "VT1", and the second valve timing is described as "VT2". A present engine speed, a previous step value of the target air amount, which is calculated in the arithmetic unit 162, and a switch flag signal that is outputted from the arithmetic unit 506 which will be described later are inputted to the arithmetic unit 502.

In a period in which the switch flag signal that is outputted from the arithmetic unit 506 is on, the arithmetic unit 502 outputs the first valve timing as the target valve timing. Subsequently, when the arithmetic unit 502 detects that the switch flag signal is switched from on to off, the arithmetic unit 502 switches the target valve timing to be outputted, from the first valve timing to the second valve timing. The stoichiometric VT map corresponds to first valve timing calculation means in the present invention, the lean VT map corresponds to second valve timing calculation means in the present invention, and the arithmetic unit 502 corresponds to target valve timing switching means in the present invention.

Next, the arithmetic unit 504 will be described. The arithmetic unit 504 calculates a target air amount arrival prediction time period. The target air amount arrival prediction time period is a prediction value of a time period that is required until the estimated air amount arrives at the target air amount. The previous step value of the target air amount, which is calculated in the arithmetic unit 162, and a previous step value of the estimated air amount, which is calculated in the arithmetic unit 174, are inputted to the arithmetic unit 504.

Figure 4:
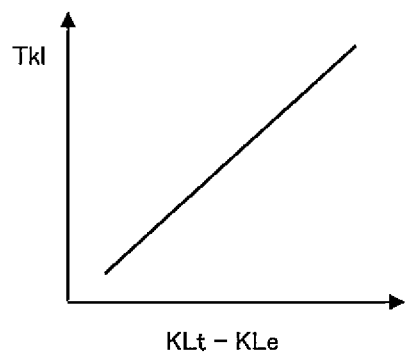
FIG. 4 is a map describing a relation between a difference between a target air amount and an estimated air amount, and a target air amount arrival prediction time period.
Figure 5:
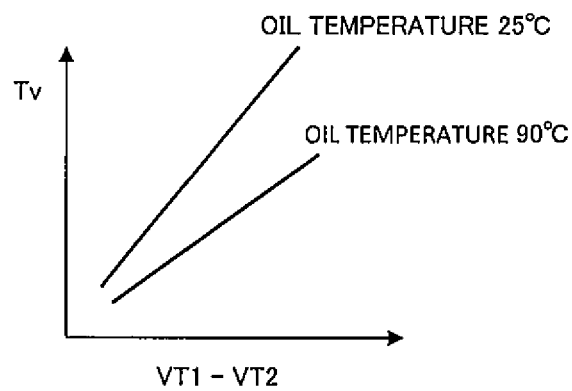
FIG. 5 is a map describing a relation between a difference between a first valve timing and a second valve timing, and a lean valve timing arrival prediction time period.

In calculation of the target air amount arrival prediction time period, a map is used, that describes a relation between a difference between the target air amount and the estimated air amount, and the target air amount arrival prediction time period. FIG. 5 illustrates an example of the map like this. The difference between the target air amount and the estimated air amount means an air amount that is required until the air amount arrives at the target air amount. Therefore, as illustrated in FIG. 4, the target air amount arrival prediction time period becomes larger as the difference between the target air amount and the estimated air amount is larger. The arithmetic unit 504 calculates the difference between the target air amount and the estimated air amount, and calculates the target air amount arrival prediction time period in accordance with the map illustrated in FIG. 5. In the drawings, the target air amount arrival prediction time period is described as "Tkl". The target air amount arrival prediction time period corresponds to a first prediction time period in the present invention, and the arithmetic unit 504 corresponds to first prediction time period calculation means in the present invention.

Next, the arithmetic unit 506 will be described. The arithmetic unit 506 calculates a lean valve timing arrival prediction time period. The lean valve timing arrival prediction time period is a prediction value of a time period that is required to change the valve timing from the first valve timing to the second valve timing by operating the VVT 8.

In calculation of the lean valve timing arrival prediction time period, a map is used, that describes a relation between the difference between the first valve timing and the second valve timing, and the lean valve timing arrival prediction time period. FIG. 5 illustrates one example of the map like this. Since the relation between the difference between the first valve timing and the second valve timing, and the valve timing arrival prediction time period changes in accordance with an engine oil temperature, a parameter value in the above described map is determined based on a present engine oil temperature in calculation of the lean valve timing arrival prediction time period. In the drawings, the lean valve timing arrival prediction time period is described as "Tv". The lean valve timing arrival prediction time period corresponds to a second prediction time period in the present invention, and the arithmetic unit 502 corresponds to second prediction time period calculation means in the present invention.

Finally, the arithmetic unit 508 outputs a switch flag signal based on the virtual air-fuel ratio. The switch flag signal refers to a signal for switching the map for use in calculation of the target valve timing between the stoichiometric VT map and the lean VT map. In FIG. 3, the switch flag signal is described as "FLGVT". In a period in which the virtual air-fuel ratio which is inputted from the arithmetic unit 404 is the first air-fuel ratio, the arithmetic unit 506 sets the switch flag signal at on. When the arithmetic unit 506 detects that the virtual air-fuel ratio which is inputted from the arithmetic unit 404 is switched from the first air-fuel ratio to the second air-fuel ratio, the arithmetic unit 506 calculates a difference between the lean valve timing arrival prediction time period and the target air amount arrival prediction time period. Subsequently, when the target air amount arrival time period is sufficiently close to the lean valve timing arrival prediction time period, more specifically, when the target air amount arrival time period and the lean valve timing arrival prediction time period coincide with each other, the arithmetic unit 506 switches the switch flag signal from on to off. That is to say, at a time of deceleration when the requested first torque decreases, switching of the switch flag signal from on to off is performed after switching of the virtual air-fuel ratio from the first air-fuel ratio to the second air-fuel ratio. The switch flag signal which is outputted from the arithmetic unit 508 is inputted to the arithmetic unit 502. The arithmetic unit 502 switches the map for use in calculation of the target valve timing from the stoichiometric VT map to the lean VT map in accordance with the inputted switch flag signal. Thereby, the target valve timing to be calculated is switched from the first valve timing to the second valve timing.

Next, a control result in a case of executing engine control in accordance with the aforementioned logic will be described in comparison with a control result according to a comparative example. In the comparative example, in the logic of the control device illustrated in FIG. 1, the target valve timing is switched from the first valve timing to the second valve timing, at a time point at which the virtual air-fuel ratio is changed from the first air-fuel ratio to the second air-fuel ratio.

Figure 6:
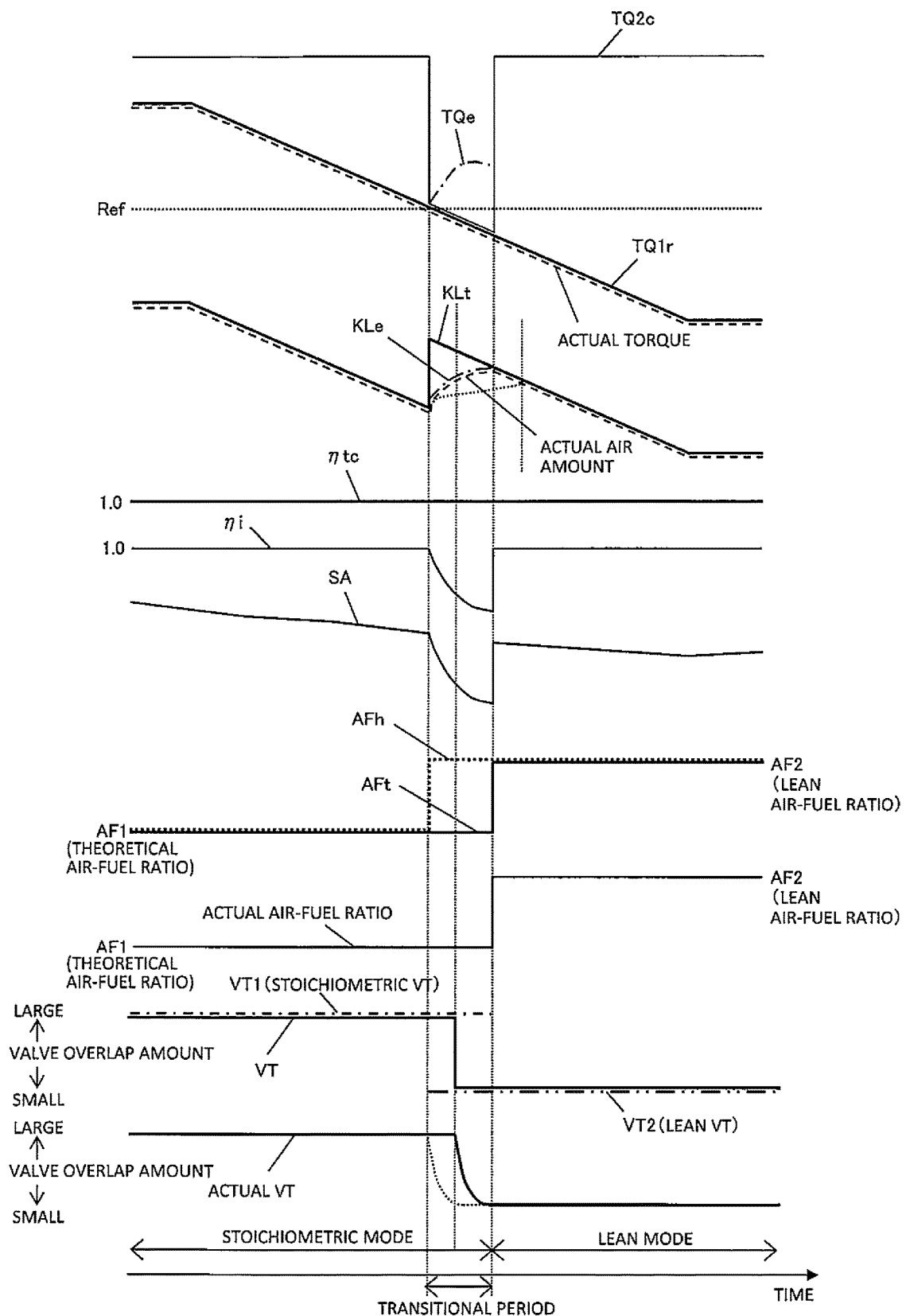
FIG. 6 is a time chart illustrating an image of a control result by the control device according to the first embodiment of the present invention.
Figure 7:
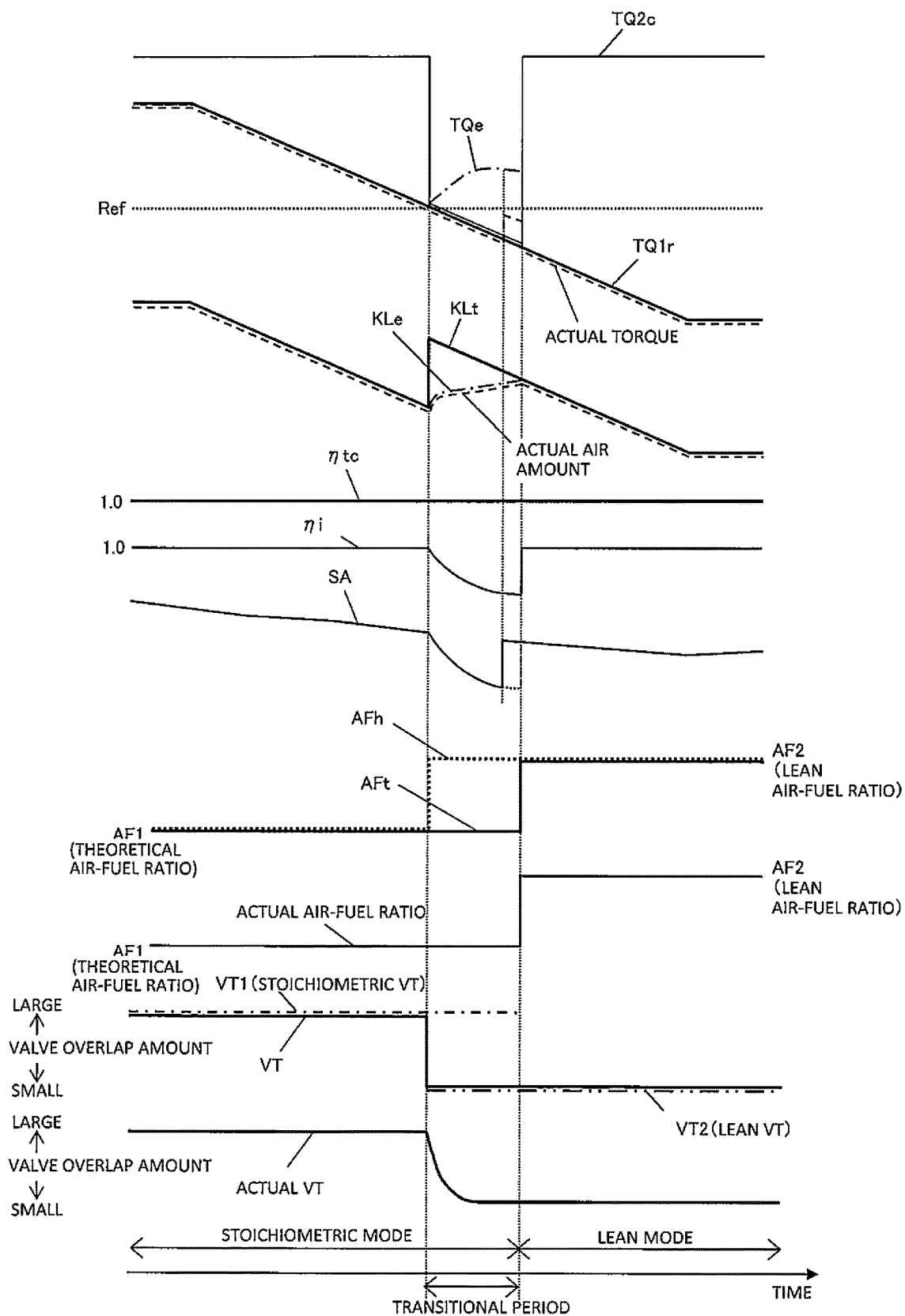
FIG. 7 is a time chart illustrating an image of a control result according to a comparative example.

FIG. 6 is a time chart illustrating an image of the control result by the ECU according to the present embodiment. FIG. 7 is a time chart illustrating an image according to the comparative example. In both of FIG. 6 and FIG. 7, charts in first tiers illustrate changes over time of torques. As described above, "TQ1r" denotes the requested first torque, "TQ2c" denotes the target second torque for switching, and "TQe" denotes the estimated torque. Note that here, the requested first torque is the final target first torque, and the target second torque for switching is the final target second torque. Further, apart from these torques, actual torques are expressed by dotted lines in the charts. However, the actual torques are not measured in actual engine control. The lines of the actual torques which are drawn in the charts are image lines which are supported by test results.

Charts in second tiers in FIG. 6 and FIG. 7 illustrate changes over time of the air amounts. As described above, "KLt" denotes the target air amount, and "KLe" denotes the estimated air amount. In the charts, actual air amounts are expressed by dotted lines together with these air amounts. However, the actual air amounts are not measured in actual engine control. The lines of the actual air amounts which are drawn in the charts are image lines that are supported by test results.

Charts in third tiers in FIG. 6 and FIG. 7 illustrate changes over time of the target efficiencies for switching. As described above, "ηtc" denotes the target efficiency for switching. Note that here, the target efficiency for switching is a final target efficiency.

Charts in fourth tiers in FIG. 6 and FIG. 7 illustrate changes over time of the indicated ignition timing efficiencies. As described above, "ηi" denotes the indicated ignition timing efficiency.

Charts in fifth tiers in FIG. 6 and FIG. 7 illustrate changes over time of the ignition timings. As described above, "SA" denotes the ignition timing.

Charts in sixth tires in FIG. 6 and FIG. 7 illustrate changes over time of the air-fuel ratios. As described above, "AFt" denotes the target air-fuel ratio, and "AFh" denotes the virtual air-fuel ratio. Further, "AF1" denotes the first air-fuel ratio which is the theoretical air-fuel ratio, and "AF2" is the second air-fuel ratio which is the lean air-fuel ratio. Charts in seventh tiers in FIG. 6 and FIG. 7 illustrate changes over time of actual air-fuel ratios.

Charts in eighth tiers in FIG. 6 and FIG. 7 illustrate changes over time of the valve timings. As described above, "VT" denotes the target valve timing, "VT1" denotes the first valve timing, "VT2" denotes the second valve timing. Charts in ninth tiers in FIG. 6 and FIG. 7 illustrate changes over time of actual valve timings. However, the actual valve timings are not measured in actual engine control. Lines of the actual valve timings which are drawn in the charts are image lines that are supported by test results.

First, the control result according to the comparative example illustrated in FIG. 7 will be examined. According to the comparative example, the virtual air-fuel ratio is switched from the first air-fuel ratio to the second air-fuel ratio prior to switching of the target air-fuel ratio from the first air-fuel ratio to the second air-fuel ratio. By the switching, the target air-fuel ratio increases to an air amount corresponding to the second air-fuel ratio in a step manner, and the actual air amount also increases in such a manner as to track the target air amount. By increasing the target air amount prior to switching of the target air-fuel ratio like this, the air amount can be increased to the amount corresponding to the second air-fuel ratio by a time point of switching of the target air-fuel ratio.

Further, according to the comparative example, at the time point of switching of the virtual air-fuel ratio from the first air-fuel ratio to the second air-fuel ratio, the target valve timing is switched from the value of the first valve timing to the value of the second valve timing. By the switching, the target valve timing changes to a valve timing corresponding to the second air-fuel ratio in a step manner, and the actual valve timing also changes to a large degree in such a manner as to track the target valve timing. By changing the target valve timing to the value after switching of the target air-fuel ratio prior to switching of the target air-fuel ratio like this, the valve timing can be changed to a timing corresponding to the second air-fuel ratio by the time point of switching of the target air-fuel ratio.

However, according to the comparative example, in a transitional period until switching of the target air-fuel ratio after the target air amount is switched, the actual air-fuel ratio is still controlled to the theoretical air-fuel ratio, although the target valve timing is switched to the second valve timing. Since the second valve timing is a displacement angle at an advance side from the first valve timing, a valve overlap amount at the second valve timing is smaller than a valve overlap amount at the first valve timing. Therefore, when the actual valve timing changes to the second valve timing under the situation with the theoretical air-fuel ratio, increase in the air amount becomes slow due to the decrease in the valve overlap amount, and the time period that is required before the target air amount is achieved is prolonged.

The air amount becomes exceeds the air amount which is necessary to achieve the requested first torque correspondingly to the amount by which the target air amount is increased prior to switching of the target air-fuel ratio. According to the logic illustrated in FIG. 1, the increase in the torque by the excessive air amount is cancelled out by decrease in the torque by retardation of the ignition timing. However, when the time period until switching of the target air-fuel ratio after switch of the target air amount is prolonged due to slowness of increase in the air amount described above, it is feared that the retardation time period of the ignition timing exceeds a limit time period (for example, 0.5 to 1.0 sec or more) that is set based on the temperature constraint of the exhaust system components such as the turbocharger and the catalyst. In this case, since the retardation time period of the ignition timing is restricted by the limit time period by the guard function for preventing an excess of temperature, the ignition timing cannot be retarded throughout a necessary time period, and increase in torque due to an excessive air amount cannot be avoided. As a result, in the comparative example illustrated in FIG. 7, the actual torque temporarily becomes excessive with respect to the requested first torque, and smooth decrease of torque corresponding to the deceleration request by the driver is impaired.

Next, the control result by the logic which is adopted in the present embodiment will be described based on FIG. 6. At a time of deceleration, until the requested first torque is reduced to a level of the reference value which is described by "Ref", the target air-fuel ratio and the virtual air-fuel ratio are both kept at the first air-fuel ratio which is the theoretical air-fuel ratio. Therefore, the target air amount which is calculated from the requested first torque and the virtual air-fuel ratio decreases in an interlocking manner with the decrease in the requested first torque. The target second torque for switching in this period is made an invalid value in response to the target air-fuel ratio and the virtual air-fuel ratio corresponding to each other. Since the indicated ignition timing efficiency becomes 1 if the target second torque for switching is an invalid value, the ignition timing is kept at an optimal ignition timing. Note that in the chart, the ignition timing changes in accordance with the decrease in the requested first torque, and this is the change that corresponds to the optimal ignition timing changing in accordance with the engine speed and the air amount.

When the requested first torque becomes lower than the reference value, only the virtual air-fuel ratio is switched from the first air-fuel ratio to the second air-fuel ratio. That is, although the target air-fuel ratio is maintained at the theoretical air-fuel ratio, the virtual air-fuel ratio is made leaner in a step manner. Operation according to the second air-fuel ratio that is a lean air-fuel ratio requires a larger air amount than the air amount required for operation according to the first air-fuel ratio that is the theoretical air-fuel ratio. Therefore, when the virtual air-fuel ratio that is used for calculating the target air amount is switched in a step manner to the second air-fuel ratio, the target air amount also increases in a step manner at the time point of such switching. However, because there is a response delay until the actuator operates and the air amount changes, the actual air amount and the estimated air amount that is an estimated value thereof do not increase in a step manner, and increase at a delayed time relative to the target air amount. The actual air amount and the estimated air amount converge to the target air amount, and in due course, the difference between the target air amount and the estimated air amount becomes equal to or smaller than a threshold value. At this point of time, the target air-fuel ratio is switched from the first air-fuel ratio to the second air-fuel ratio.

Further, after switching of the virtual air-fuel ratio from the first air-fuel ratio to the second air-fuel ratio, in the time period in which the target air amount arrival prediction time period is larger than the lean valve timing arrival prediction time period, the target valve timing is kept at the first valve timing. Thereby, the valve overlap time period in this period is kept to be large, and therefore, a responsiveness of the actual air amount to the target air amount is enhanced. When the target air amount arrival prediction time period coincides with the lean valve timing arrival prediction time period thereafter, the target valve timing is switched from the first valve timing to the second valve timing at this point of time. When the target valve timing is switched, the actual valve timing tracks this and changes, and switching to the second valve timing is completed at the point of time at which the target air-fuel ratio is switched from the first air-fuel ratio to the second air-fuel ratio.

During a period until the target air-fuel ratio and the virtual air-fuel ratio coincide with each other again after the requested first torque becomes lower than the reference value and the target air-fuel ratio and the virtual air-fuel ratio deviate from each other, the target second torque for switching is set at the same value as the requested first torque which is a valid value. Meanwhile, the estimated torque predicated on the virtual air-fuel ratio becomes a value larger than the requested first torque predicated on the target air-fuel ratio as the virtual air-fuel ratio that is used in calculation of the target air amount is made leaner than the target air-fuel ratio. As the result, the indicated ignition timing efficiency which is the proportion of the target second torque for switching relative to the estimated torque becomes a value smaller than one. Subsequently, in response to the indicated ignition timing efficiency becoming smaller than one, the ignition timing is retarded from the optimal ignition timing. As the result, increase in the torque by the excessive air amount is cancelled out by decrease in the torque by retardation of the ignition timing, and the deviation of the actual torque from the requested first torque is prevented.

In the comparative example which is described above, in the transitional period in which switching of the operation mode is performed, the target valve timing is made the second valve timing. However, since the valve overlap amount is small with the second valve timing, the actual air-fuel ratio cannot be increased with a high responsiveness in accordance with increase in the target air-fuel ratio. As a result, the transitional period is prolonged, and increase in torque due to the excessive air amount cannot be sufficiently cancelled out by retardation of the ignition timing. In relation to this, according to the logic which is adopted in the present embodiment, the switching timing is determined so that the valve timing is switched to the second valve timing at the time point at which the transitional period ends. According to switching of the valve timing like this, the transitional period is shortened by the air amount in the transitional period being increased with a high responsiveness. Therefore, the ignition timing is not retarded for a long time period until the retardation time period reaches the limit time period, and increase in torque due to the excessive air amount is reliably canceled out by decrease in torque by retardation of the ignition timing. Therefore, according to the logic which is adopted in the present embodiment, the operation mode can be changed from the operation by the first air-fuel ratio to the operation by the second air-fuel ratio without causing a torque variation.

[Second Embodiment]

Next, a second embodiment of the present invention will be described with reference to the drawings.

An engine which is taken as a control object in the present embodiment is a spark-ignition type, four-cycle reciprocating engine, and is a turbocharging lean-burn engine including a turbocharger. Actuators that are operated by an ECU that controls an operation of the engine include a wastegate valve (hereunder referred to as a WGV) that is provided in the turbocharger, in addition to a throttle, a VVT, an ignition device and an injector. The WGV is a turbocharging property variable actuator that changes a turbocharging property of the turbocharger. Since the turbocharging property of the turbocharger changes an air amount, the WGV is included in the first actuator that changes the air amount similarly to the throttle and the VVT.

Figure 8:
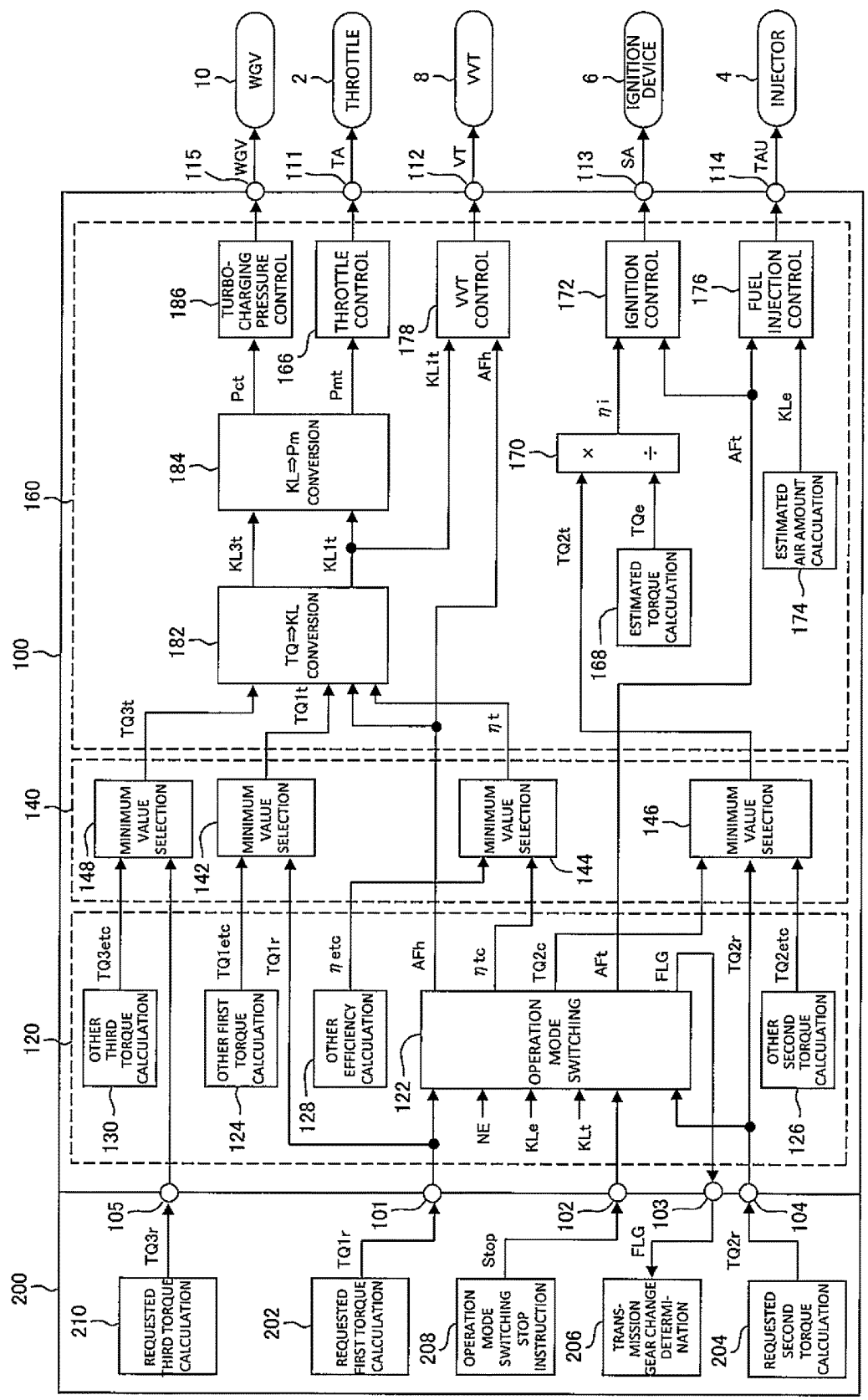
FIG. 8 is a block diagram illustrating a logic of a control device according to a second embodiment of the present invention.

In FIG. 8, a logic of the ECU according to the present embodiment is illustrated in a block diagram. The ECU includes the engine controller 100 and the powertrain manager 200. In the block illustrating the powertrain manager 200, various functions with which the powertrain manager 200 is equipped are expressed by blocks. Among the blocks, blocks representing the functions common to the functions of the ECU according to the first embodiment are assigned with common reference signs. Further, in the block representing the engine controller 100, among various functions with which the engine controller 100 is equipped, functions relating to the coordinated operations of the actuators are represented by blocks. Among the blocks, blocks representing common functions to the functions of the ECU according to the first embodiment are assigned with common reference signs. Hereunder, a difference from the first embodiment, that is, the blocks representing the functions peculiar to control of the turbocharging lean-burn engine will be mainly described.

The powertrain manager 200 according to the present embodiment is equipped with an arithmetic unit 210 in addition to the arithmetic units 202, 204, 206 and 208 which are common to the first embodiment. The arithmetic unit 210 calculates a requested third torque and sends the requested third torque to the engine controller 100. In FIG. 7, the requested third torque is described as "TQ3r". A third torque is a torque that is required from the engine regularly or for a long time period similarly to the first torque. A relation between the third torque and the first torque is analogous to the relation between the first torque and the second torque. That is to say, in a case of being seen from the side of the first torque, the first torque is a kind of torque that has higher urgency or priority than the third torque, and requests a high responsiveness from the engine, that is, a kind of torque which is required to be realized earlier. The requested third torque is a requested value of the third torque which the powertrain manager 200 requests from the engine. Listing the three kinds of requested torques which are calculated in the powertrain manager 200 in sequence from the highest urgency or priority, that is, the highest responsiveness requested from the engine, the ranking of the kinds is such that the requested second torque, the requested first torque and the requested third torque. The arithmetic unit 210 calculates the requested third torque based on the signal that responds to the degree of accelerator pedal opening. In the present embodiment, the requested third torque as well as the requested first torque corresponds to the requested torque in the present invention. A torque obtained by removing a pulse component in a temporary torque reduction direction from the requested first torque can be also set as the requested third torque.

The engine controller 100 according to the present embodiment is configured by the three large arithmetic units 120, 140 and 160 similarly to the first embodiment. The large arithmetic unit 120 is equipped with an arithmetic unit 130 in addition to the arithmetic units 122, 124, 126 and 128 common to the first embodiment. The arithmetic unit 130 calculates, as a control parameter for the engine, a torque classified into the third torque, among the torques required to keep the present operating state of the engine or realize a predetermined operating state which is scheduled. Here, the torque that is calculated in the arithmetic unit 130 is referred to as "other third torque". In FIG. 7, the other third torque is described as "TQ3etc". The arithmetic unit 130 outputs a valid value only when such a torque is actually required, and calculates an invalid value while such a torque is not required. The invalid value is set at a value larger than a maximum indicated torque that can be outputted by the engine.

The large arithmetic unit 140 according to the present embodiment is equipped with an arithmetic unit 148 in addition to the arithmetic units 142, 144 and 146 common to the first embodiment. The arithmetic unit 148 is configured to perform a mediation process with respect to the third torque. The requested third torque and the other third torque are inputted to the arithmetic unit 148. The arithmetic unit 148 performs a mediation process with respect to them, and outputs a torque obtained by performing the mediation process as the finally determined target third torque. In FIG. 7, the finally determined target third torque is described as "TQ3t". As the mediation method in the arithmetic unit 148, minimum value selection is used. Accordingly, when the valid value is not outputted from the arithmetic unit 130, the requested third torque which is provided by the powertrain manager 200 is calculated as the target third torque.

The large arithmetic unit 160 according to the present embodiment deals all of the target first torque, the target second torque and the target third torque which are inputted from the large arithmetic unit 140 as the target values of the torque for the engine. Therefore, the large arithmetic unit 160 according to the present embodiment includes an arithmetic unit 182 in place of the arithmetic unit 162 according to the first embodiment, and includes an arithmetic unit 184 in place of the arithmetic unit 164 according to the first embodiment.

The target first torque and the target third torque are inputted to the arithmetic unit 182, and the target efficiency and the virtual air-fuel ratio are further inputted to the arithmetic unit 182. The arithmetic unit 182 corresponds to the target air amount calculation means in the present invention. The arithmetic unit 182 calculates a target air amount for achieving the target first torque (hereunder, referred to as a target first air amount) backwards from the target first torque by using the target efficiency and the virtual air-fuel ratio, by the common method to the arithmetic unit 162 according to the first embodiment. In FIG. 7, the target first air amount is described as "KL1t". In the present embodiment, the target first air amount is used in calculation of the target valve timing by the arithmetic unit 178.

Further, in parallel with the calculation of the target first air amount, the arithmetic unit 182 calculates a target air amount for achieving the target third torque (hereunder referred to as a target third air amount) backwards from the target third torque by using the target efficiency and the virtual air-fuel ratio. In FIG. 7, the target third air amount is described as "KL3t". In the calculation of the target third air amount, the target efficiency and the virtual air-fuel ratio are also used as parameters that provide a conversion efficiency of the air amount to torque. If the value of the virtual air-fuel ratio is changed as in the first embodiment in the calculation of the target first air amount, the value of the virtual air-fuel ratio is also changed similarly in the calculation of the target third air amount.

The arithmetic unit 184 calculates the target intake pipe pressure backwards from the target first air amount by the common method to the arithmetic unit 164 according to the first embodiment. In the drawings, the target intake pipe pressure is described as "Pmt". The target intake pipe pressure is used in calculation of the target degree of throttle opening by the arithmetic unit 166.

Further, in parallel with the calculation of the target intake pipe pressure, the arithmetic unit 182 calculates a target turbocharging pressure backwards from the target third air amount. In FIG. 7, the target turbocharging pressure is described as "Pct". In the calculation of the target turbocharging pressure, first of all, the target third air amount is converted to the intake pipe pressure by the common method to the case of calculating the target intake pipe pressure. Subsequently, a reserve pressure is added to the intake pipe pressure which is obtained by converting the target third air amount, and a total value thereof is calculated as the target turbocharging pressure. The reserve pressure is a minimum margin of the turbo charging pressure to the intake pipe pressure. Note that the reserve pressure may have a fixed value, but can be changed by being interlocked with the intake pipe pressure, for example.

The large arithmetic unit 160 according to the present embodiment is further equipped with an arithmetic unit 186. The arithmetic unit 186 calculates a target degree of wastegate valve opening that is a target value of a degree of wastegate valve opening based on the target turbocharging pressure. In FIG. 7, the target degree of wastegate valve opening is described as "WGV". In the calculation of the target degree of wastegate valve opening, a map or a model in which the turbocharging pressure and the degree of wastegate valve opening are related is used. The target degree of wastegate valve opening which is calculated in the arithmetic unit 186 is converted to a signal to drive the WGV 10 and is sent to the WGV 10 through the interface 115 of the ECU. The arithmetic unit 186 also corresponds to the first actuator control means in the present invention. Note that as an operation amount of the WGV 10, a duty ratio of a solenoid that drives WGV 10 may be adopted, instead of the degree of wastegate valve opening.

According to the ECU which is configured as above, by performing coordinated operations of the plurality of actuators 2, 4, 6, 8 and 10 including the WGV 10, the problem of switching the air-fuel ratio with a high responsiveness while smoothly changing the torque in accordance with the request of the driver can be also achieved in the turbo charging lean-burn engine. Note that in the turbocharging lean-burn engine, VVT intake air amount control may be used in combination when the target valve timing is calculated.

Figure 9:
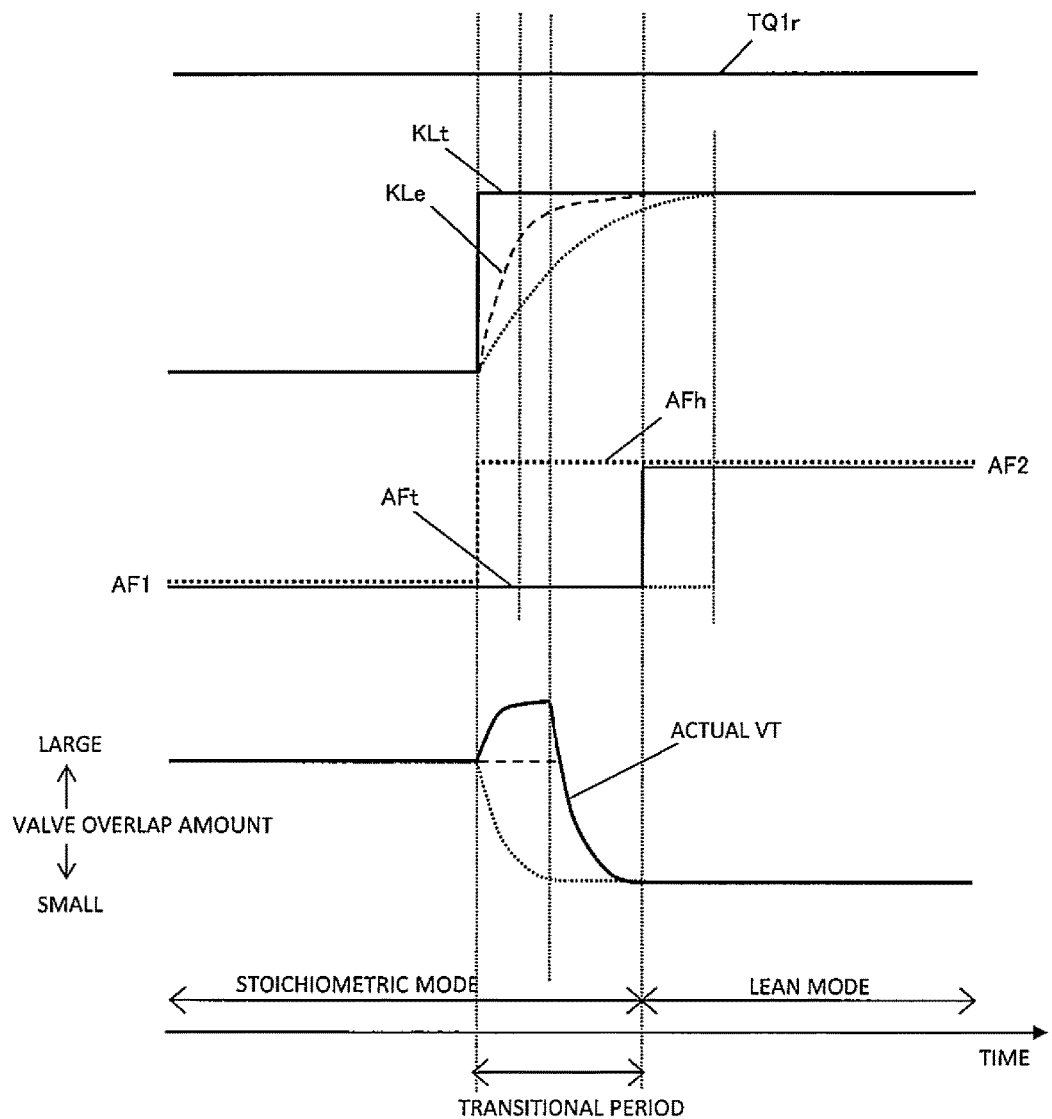
FIG. 9 is a time chart illustrating an image of a control result by the control device according to the second embodiment of the present invention.

Here, the VVT intake air amount control means control that advances the valve timing from a base valve timing with the target valve timing which is calculated with use of the map as the base valve timing, in order to increase the actual air amount at a maximum speed to cause the actual air amount to track the target air amount, when a large difference occurs between the target air amount and the actual air amount by increase in the target air amount at the time of acceleration or the like. FIG. 9 is a time chart illustrating an image of the control result by the ECU according to the present embodiment. FIG. 9 illustrates the control result in a case of using the VVT intake amount control in combination at the time of calculation of the target valve timing. A chart in a first tier in FIG. 9 illustrates a change over time of the requested first torque. A chart in a second tier illustrates respective changes over time of the target air amount and the estimated air amount. A chart in a third tier illustrates respective changes over time of the virtual air-fuel ratio and the target air-fuel ratio. A chart in a fourth tier illustrates a change over time of the actual valve timing.

In the control result illustrated in FIG. 9, the target air amount increases to a large degree in a step manner at a time point at which the virtual air-fuel ratio is switched from the first air-fuel ratio to the second air-fuel ratio. In the VVT intake air amount control, control that advances the valve timing from the first valve timing which is the base valve timing in this period is executed in response to a deviation between the target air amount and the actual air amount. When the valve timing is advanced, the actual air amount increases at a high speed due to further increase in the valve overlap amount, and as a result, the transitional period can be made short. When the target air amount arrival prediction time period coincides with the lean valve timing arrival prediction time period, the target valve timing is switched to the second valve timing at this point of time. When the target valve timing is switched, the actual valve timing decreases by tracking this, and at the time point at which the target air-fuel ratio is switched from the first air-fuel ratio to the second air-fuel ratio, switching to the second valve timing is completed. Therefore, according to the logic which is adopted in the present embodiment, the operation mode can be switched from the operation by the first air-fuel ratio to the operation by the second air-fuel ratio without causing a torque variation.

[Others]

The present invention is not limited to the aforementioned embodiments, and can be carried out by being modified variously within the range without departing from the gist of the present invention. For example, modifications as follows may be adopted.

In the first embodiment, the timing at which the switch flag is switched from on to off is not limited to the timing at which the target air amount arrival prediction time period and the lean valve timing arrival prediction time period coincide with each other. That is to say, as long as the timing at which the target air amount arrival time period is sufficiently close to the lean valve timing arrival prediction time period is determined, a timing at which the difference between the target air amount arrival time period and the lean valve timing arrival prediction time period becomes a threshold value or less can be also adopted.

The air-fuel ratio (virtual air-fuel ratio) that is used for calculating a target air amount in the first embodiment can be replaced with an equivalence ratio. The equivalence ratio is also a parameter that provides a conversion efficiency of the air amount to torque, and corresponds to a parameter that corresponds to the air-fuel ratio. Likewise, an excess air factor can be used as a parameter that provides a conversion efficiency of the air amount to torque.

As the parameter for use in the calculation of the target air amount, a parameter corresponding to the ignition timing can be also used. As the ignition timing is retarded more from the optimal ignition timing, the torque which is generated with the same air amount becomes lower, and therefore, the parameter corresponding to the ignition timing corresponds to a parameter which provides a conversion efficiency of the air amount to torque. For example, a torque-air amount conversion map which is used in the calculation of the target air amount is prepared at each ignition timing, and the value of the ignition timing that is used in search of the map can be changed in response to switching of the operation mode. More specifically, at the time of deceleration when the requested first torque decreases, the ignition timing which is used to search the map is set as the optimal ignition timing in a period in which the requested first torque is larger than the reference value, and the ignition timing which is used to search the map is retarded from the optimal ignition timing in response to decrease of the requested torque to the reference value or smaller. In this case, the air-fuel ratio which is used to search the map is the target air-fuel ratio.

A variable lift amount mechanism that makes a lift amount of the intake valve variable can also be used as a first actuator that changes the amount of air drawn into the cylinders. The variable lift amount mechanism can be used in combination with another first actuator such as the throttle or VVT.

A variable nozzle can also be used as a third actuator that changes a supercharging property of the turbocharger. Further, if the turbocharger is assisted by an electric motor, the electric motor can also be used as a third actuator.

In the embodiment of the present invention, an injector as the second actuator is not limited to a port injector. An in-cylinder injector that injects fuel directly into the combustion chamber can also be used, and both a port injector and an in-cylinder injector may also be used in combination.

The first air-fuel ratio is not limited to the theoretical air-fuel ratio. The first air-fuel ratio can also be set to an air-fuel ratio that is leaner than the theoretical air-fuel ratio, and an air-fuel ratio that is leaner than the first air-fuel ratio can be set as the second air-fuel ratio.

REFERENCE SIGNS LIST

2 Throttle
4 Injector
6 Ignition device
8 Variable valve timing mechanism
10 Wastegate valve
100 Engine controller
101; 105 Interface as requested torque receiving means
200 Powertrain manager
162; 182 Arithmetic unit as target air amount calculation means
164, 166; 178 Arithmetic unit as first actuator control means
174, 176 Arithmetic unit as second actuator control means
168, 170, 172 Arithmetic unit as third actuator control means
404 Arithmetic unit as virtual air-fuel ratio changing means
406 Arithmetic unit as target air-fuel ratio switching means
502, 508 Arithmetic unit as target valve timing switching means
504 Arithmetic unit as first prediction time period calculation means 506 Arithmetic unit as second prediction time period calculation means

The invention claimed is:

1. A control device for an internal combustion engine that has a first actuator that changes an amount of air that is taken into a cylinder, a second actuator that supplies fuel into the cylinder, and a third actuator that ignites a mixture gas in the cylinder, and is configured to be capable of selecting an operation that makes a first air-fuel ratio a target air-fuel ratio and an operation that makes a second air-fuel ratio that is leaner than the first air-fuel ratio a target air-fuel ratio, comprising:

requested torque reception means for receiving a requested torque;

target air amount calculation means for calculating a target air amount for achieving the requested torque from the requested torque by using a virtual air-fuel ratio which is a parameter that provides a conversion efficiency from an air amount to torque;

virtual air-fuel ratio changing means for changing the virtual air-fuel ratio from the first air-fuel ratio to the second air-fuel ratio, in response to a condition for switching an operation mode from an operation by the first air-fuel ratio to an operation by the second air-fuel ratio being satisfied;

target air-fuel ratio switching means for switching a target air-fuel ratio from the first air-fuel ratio to the second air-fuel ratio, after the virtual air-fuel ratio is changed from the first air-fuel ratio to the second air-fuel ratio;

first actuator control means for determining an operation amount of the first actuator based on the target air amount, and operating the first actuator in accordance with the operation amount;

second actuator control means for determining a fuel supply amount based on the target air-fuel ratio, and operating the second actuator in accordance with the fuel supply amount; and third actuator control means for determining an ignition timing for achieving the requested torque based on a torque that is estimated from the operation amount of the first actuator and the target air-fuel ratio, and the requested torque, and operating the third actuator in accordance with the ignition timing, wherein the first actuator includes a variable valve timing mechanism that changes a valve timing of an intake valve, the first actuator control means comprises means for calculating a first valve timing that is a target valve timing corresponding to the first air-fuel ratio based on the target air amount, means for calculating a second valve timing that is a target valve timing corresponding to the second air-fuel ratio based on the target air amount, target valve timing switching means for switching the target valve timing from the first valve timing to the second valve timing after the virtual air-fuel ratio is changed from the first air-fuel ratio to the second air-fuel ratio, and means for operating the variable valve timing mechanism in accordance with the target valve timing.

2. The control device for an internal combustion engine according to claim 1, wherein the target valve timing switching means includes:

first prediction time period calculation means for calculating a first prediction time period that is a prediction value of a time period that is required until an air amount that is estimated from the operation amount of the first actuator reaches the target air amount, second prediction time period calculation means for calculating a second prediction time period that is a prediction value of a time period that is required for the variable valve timing mechanism to be operated from a position of the first valve timing to a position of the second valve timing, and means for switching the target valve timing from the first valve timing to the second valve timing at a time point at which the first prediction time period coincides with the second prediction time period after the virtual air-fuel ratio is changed from the first air-fuel ratio to the second air-fuel ratio.

3. The control device for an internal combustion engine according to claim 1, wherein the target air-fuel ratio switching means switches the target air-fuel ratio from the first air-fuel ratio to the second air-fuel ratio, after a difference between the target air amount and an air amount that is estimated from the operation amount of the first actuator becomes equal to or smaller than a threshold value, after the virtual air-fuel ratio is changed from the first air-fuel ratio to the second air-fuel ratio.

4. The control device for an internal combustion engine according to claim 1, wherein the target air-fuel ratio switching means switches the target air-fuel ratio from the first air-fuel ratio to the second air-fuel ratio, after a fixed time period elapses, after the virtual air-fuel ratio is changed from the first air-fuel ratio to the second air-fuel ratio.

5. The control device for an internal combustion engine according to claim 1, wherein the first actuator includes a throttle, and the first actuator control means determines a target degree of throttle opening based on a target intake pipe pressure that is calculated from the target air amount, and operates the throttle in accordance with the target degree of throttle opening.

6. The control device for an internal combustion engine according to claim 1, wherein the internal combustion engine is a turbocharging engine comprising a turbocharger, the first actuator includes a turbocharging property variable actuator that changes a turbocharging property of the turbocharger, and the first actuator control means determines an operation amount of the turbocharging property variable actuator based on a target turbocharging pressure that is calculated from the target air amount, and operates the turbocharging property variable actuator in accordance with the operation amount.

7. A control device for an internal combustion engine that has a first actuator that changes an amount of air that is taken into a cylinder, a second actuator that supplies fuel into the cylinder, and a third actuator that ignites a mixture gas in the cylinder, and is configured to be capable of selecting an operation that makes a first air-fuel ratio a target air-fuel ratio and an operation that makes a second air-fuel ratio that is leaner than the first air-fuel ratio a target air-fuel ratio, comprising:

requested torque reception unit that is configured to receive a requested torque;

target air amount calculation unit that is configured to calculate a target air amount for achieving the requested torque from the requested torque by using a virtual air-fuel ratio which is a parameter that provides a conversion efficiency from an air amount to torque;

virtual air-fuel ratio changing unit that is configured to change the virtual air-fuel ratio from the first air-fuel ratio to the second air-fuel ratio, in response to a condition for switching an operation mode from an operation by the first air-fuel ratio to an operation by the second air-fuel ratio being satisfied;

target air-fuel ratio switching unit that is configured to switch a target air-fuel ratio from the first air-fuel ratio to the second air-fuel ratio, after the virtual air-fuel ratio is changed from the first air-fuel ratio to the second air-fuel ratio;

first actuator control unit that is configured to determine an operation amount of the first actuator based on the target air amount, and operating the first actuator in accordance with the operation amount;

second actuator control unit that is configured to determine a fuel supply amount based on the target air-fuel ratio, and operating the second actuator in accordance with the fuel supply amount; and third actuator control unit that is configured to determine an ignition timing for achieving the requested torque based on a torque that is estimated from the operation amount of the first actuator and the target air-fuel ratio, and the requested torque, and operating the third actuator in accordance with the ignition timing, wherein the first actuator includes a variable valve timing mechanism that changes a valve timing of an intake valve, the first actuator control unit is configured to calculate a first valve timing that is a target valve timing corresponding to the first air-fuel ratio based on the target air amount, calculate a second valve timing that is a target valve timing corresponding to the second air-fuel ratio based on the target air amount, switch the target valve timing from the first valve timing to the second valve timing after the virtual air-fuel ratio is changed from the first air-fuel ratio to the second air-fuel ratio, and operate the variable valve timing mechanism in accordance with the target valve timing.

* * * * *